United States Patent
Ma et al.

(10) Patent No.: US 10,922,625 B2
(45) Date of Patent: Feb. 16, 2021

(54) DISTRIBUTED DATA PROCESSING FOR MACHINE LEARNING

(71) Applicant: Splunk Inc., San Francisco, CA (US)

(72) Inventors: Lin Ma, Vancouver (CA); Jacob Leverich, San Francisco, CA (US); Adam Oliner, San Francisco, CA (US); Alex Cruise, San Francisco, CA (US); Hongyang Zhang, Vancouver (CA)

(73) Assignee: SPLUNK Inc., San Francisco, CA (US)

( * ) Notice: Subject to any disclaimer, the term of this patent is extended or adjusted under 35 U.S.C. 154(b) by 322 days.

(21) Appl. No.: 15/885,395

(22) Filed: Jan. 31, 2018

(65) Prior Publication Data

US 2019/0095817 A1 Mar. 28, 2019

Related U.S. Application Data

(60) Provisional application No. 62/562,205, filed on Sep. 22, 2017.

(51) Int. Cl.
*G06F 17/00* (2019.01)
*G06N 20/00* (2019.01)
(Continued)

(52) U.S. Cl.
CPC ............... *G06N 20/00* (2019.01); *G06F 7/08* (2013.01); *G06F 16/24564* (2019.01);
(Continued)

(58) Field of Classification Search
CPC . G06N 20/00; G06F 16/90335; G06F 16/283; G06F 16/951; G06F 16/24564;
(Continued)

(56) References Cited

U.S. PATENT DOCUMENTS

| | | | | |
|---|---|---|---|---|
| 7,984,043 B1* | 7/2011 | Waas | ................. | G06F 16/8358 707/718 |
| 2004/0243799 A1* | 12/2004 | Hacigumus | ....... | G06F 16/24547 713/150 |

(Continued)

OTHER PUBLICATIONS

Hacigumus et al., Executing SQL over Encrypted Data in the Database-Service-Provider Model, in Proc. of ACM SIGMOD, 2002, Retreved on Jan. 27, 2020 <URL: https://dl.acm.org/doi/pdf/10.1145/564691.564717> (Year: 2002).*

*Primary Examiner* — Tyler J Torgrimson

(74) *Attorney, Agent, or Firm* — Shook, Hardy & Bacon L.L.P.

(57) ABSTRACT

Embodiments of the present invention are directed to facilitating distributed data processing for machine learning. In accordance with aspects of the present disclosure, a set of commands in a query to process at an external computing service is identified. For each command in the set of commands, at least one compute unit including at least one operation to perform at the external computing service is identified. Each of the at least one compute unit associated with each command is analyzed to identify an optimized manner in which to execute the set of commands at the external computing service. An indication of the optimized manner in which to execute the set of commands and a corresponding set of data is provided to the external computing service to utilize for executing the set of commands at the external computing service.

29 Claims, 31 Drawing Sheets

(51) Int. Cl.
| | |
|---|---|
| *G06F 7/08* | (2006.01) |
| *H04L 29/08* | (2006.01) |
| *H04L 29/06* | (2006.01) |
| *G06F 16/28* | (2019.01) |
| *G06F 16/951* | (2019.01) |
| *G06F 16/2455* | (2019.01) |
| *G06F 16/903* | (2019.01) |
| *H04L 12/24* | (2006.01) |

(52) U.S. Cl.
CPC ...... *G06F 16/283* (2019.01); *G06F 16/90335* (2019.01); *G06F 16/951* (2019.01); *H04L 41/14* (2013.01); *H04L 63/1416* (2013.01); *H04L 67/10* (2013.01)

(58) Field of Classification Search
CPC ....... G06F 7/08; H04L 41/14; H04L 63/1416; H04L 67/10
See application file for complete search history.

(56) References Cited

U.S. PATENT DOCUMENTS

| | | | |
|---|---|---|---|
| 2014/0229462 A1* | 8/2014 | Lo .................. | G06F 16/951 707/707 |
| 2018/0005293 A1* | 1/2018 | Adams .............. | G06Q 30/0625 |

* cited by examiner

| Data Summary | | | |
|---|---|---|---|
| Hosts (5) | Sources (8) | Sourcetypes (3) | × |
| filter | | | |
| Host ◊ | | Count ◊ | Last Update ◊ |
| mailsv | ıl ∨ | 9,829 | 4/29/14 1:32:47.000 PM |
| vendor_sales | ıl ∨ | 30,244 | 4/29/14 1:32:46.000 PM |
| www1 | ıl ∨ | 24,221 | 4/29/14 1:32:44.000 PM |
| www2 | ıl ∨ | 22,595 | 4/29/14 1:32:47.000 PM |
| www3 | ıl ∨ | 22,975 | 4/29/14 1:32:45.000 PM |

New Pivot 1,776,004 of 1,776,004 events matched

Filters: All time

Split Rows: component

Split Columns: group

Column Values: Count of Event O...

| component | NULL | conf | deploy-connections | deploy-server | map | mpool | per_host_thruput | per_index_thruput | per_source_thruput | per_sourcetype_thruput | pipeline | queue | realtime_search_data |
|---|---|---|---|---|---|---|---|---|---|---|---|---|---|
| BucketMover | 4 | 0 | 0 | 0 | 0 | 0 | 0 | 0 | 0 | 0 | 0 | 0 | 0 |
| DatabaseDirectoryManager | 4 | 0 | 0 | 0 | 0 | 0 | 0 | 0 | 0 | 0 | 0 | 0 | 0 |
| DateParserVerbose | 562 | 0 | 0 | 0 | 0 | 0 | 0 | 0 | 0 | 0 | 0 | 0 | 0 |
| DiskMon | 3 | 0 | 0 | 0 | 0 | 0 | 0 | 0 | 0 | 0 | 0 | 0 | 0 |
| IndexConfig | 1 | 0 | 0 | 0 | 0 | 0 | 0 | 0 | 0 | 0 | 0 | 0 | 0 |
| LicenseUsage | 2872 | 0 | 1 | 972 | 2916 | 972 | 0 | 4621 | 0 | 0 | 0 | 0 | 972 |
| Metrics | 0 | 1 | 0 | 0 | 972 | 0 | 0 | 2543 | 9314 | 9306 | 18797 | 12636 | 0 |
| OneShotWriter | 12226 | 0 | 0 | 0 | 0 | 0 | 0 | 0 | 0 | 0 | 0 | 0 | 0 |
| TailingProcessor | 2 | 0 | 0 | 0 | 0 | 0 | 0 | 0 | 0 | 0 | 0 | 0 | 0 |
| WatchedFile | 18 | 0 | 0 | 0 | 0 | 0 | 0 | 0 | 0 | 0 | 0 | 0 | 0 |
| cached | 5 | 0 | 0 | 0 | 0 | 0 | 0 | 0 | 0 | 0 | 0 | 0 | 0 |
| decorators | 2 | 0 | 0 | 0 | 0 | 0 | 0 | 0 | 0 | 0 | 0 | 0 | 0 |
| utils | 1 | 0 | 0 | 0 | 0 | 0 | 0 | 0 | 0 | 0 | 0 | 0 | 0 |
| view | 6 | 0 | 0 | 0 | 0 | 0 | 0 | 0 | 0 | 0 | 0 | 0 | 0 |

FIG. 15

| A ~ 2004 | B ~ 2006 | C ~ 2008 |
|---|---|---|
| 1 | 2 | 3 |
| 4 | 5 | 6 |
| 7 | null | 8 |
| 9 | null | 10 |
| null | null | 11 |
| null | null | 12 |

Chunk1:

| A | B | C |
|---|---|---|
| 1 | 2 | 3 |
| 4 | 5 | 6 |

Chunk2:

| C | A |
|---|---|
| 8 | 7 |
| 10 | 9 |

Chunk3:

| C |
|---|
| 11 |
| 12 |

DISTRIBUTED DATA PROCESSING FOR MACHINE LEARNING

BACKGROUND

Modern data centers often include thousands of hosts that operate collectively to service requests from even larger numbers of remote clients. During operation, components of these data centers can produce significant volumes of raw, machine-generated data. In many cases, a user wishes to predict or forecast data from such collected data. Accordingly, machine learned models are frequently generated and utilized to predict or forecast data.

BRIEF DESCRIPTION OF THE DRAWINGS

In the drawings:

FIG. 6B illustrates a data summary dialog that enables a user to select various data sources in accordance with the disclosed embodiments;

FIGS. 7A-7D illustrate a series of user interface screens for an example data model-driven report generation interface in accordance with the disclosed embodiments;

FIG. 9B illustrates an incident review dashboard in accordance with the disclosed embodiments;

FIGS. 15-17 illustrate example visualizations generated by a reporting application in accordance with the disclosed embodiments;

FIGS. 20A-20D illustrate an example data set and corresponding data chunks, in accordance with embodiments described herein;

DETAILED DESCRIPTION

Figure 1:
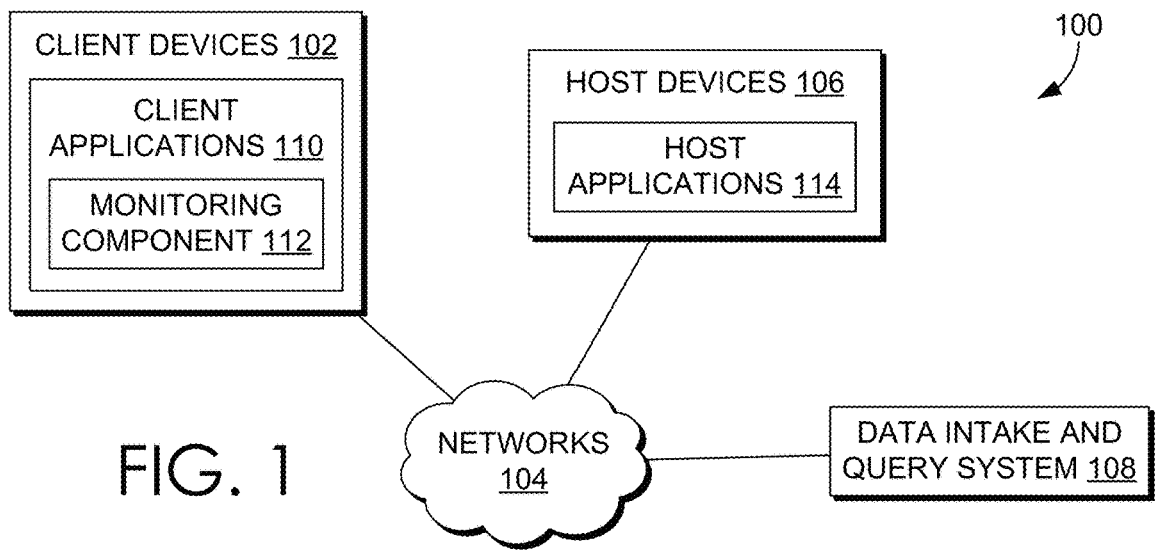
FIG. 1 illustrates a networked computer environment in which an embodiment may be implemented.

Embodiments are described herein according to the following outline:

1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Example Search Screen
   2.9. Data Modeling
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Data Center Monitoring
   2.13. Cloud-Based System Overview
   2.14. Searching Externally Archived Data
      2.14.1. ERP Process Features
3.0. Overview of Distributed Data Processing
   3.1. Overview of a Distributed Data Processing Environment
   3.2. Illustrative Distributed Data Processing Operations
   3.3. Illustrative Hardware System
1.0 General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
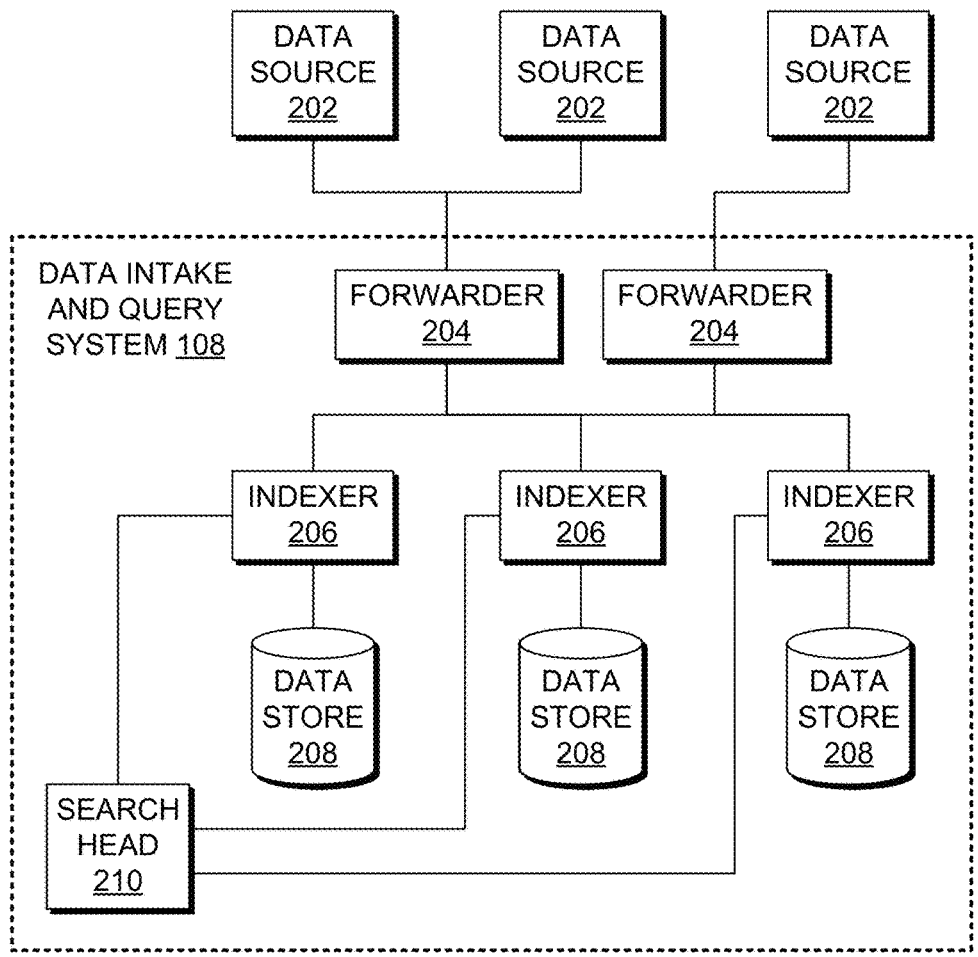
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
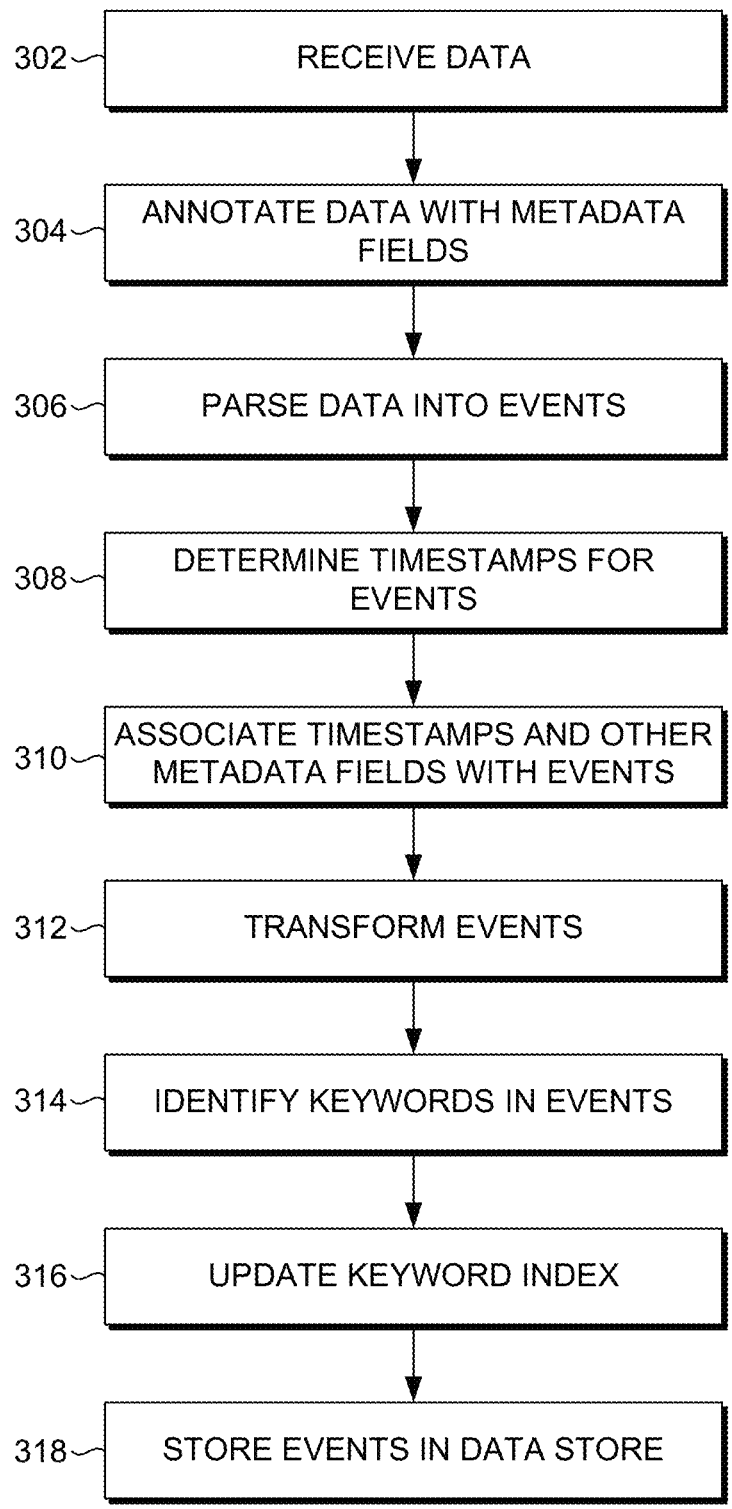
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
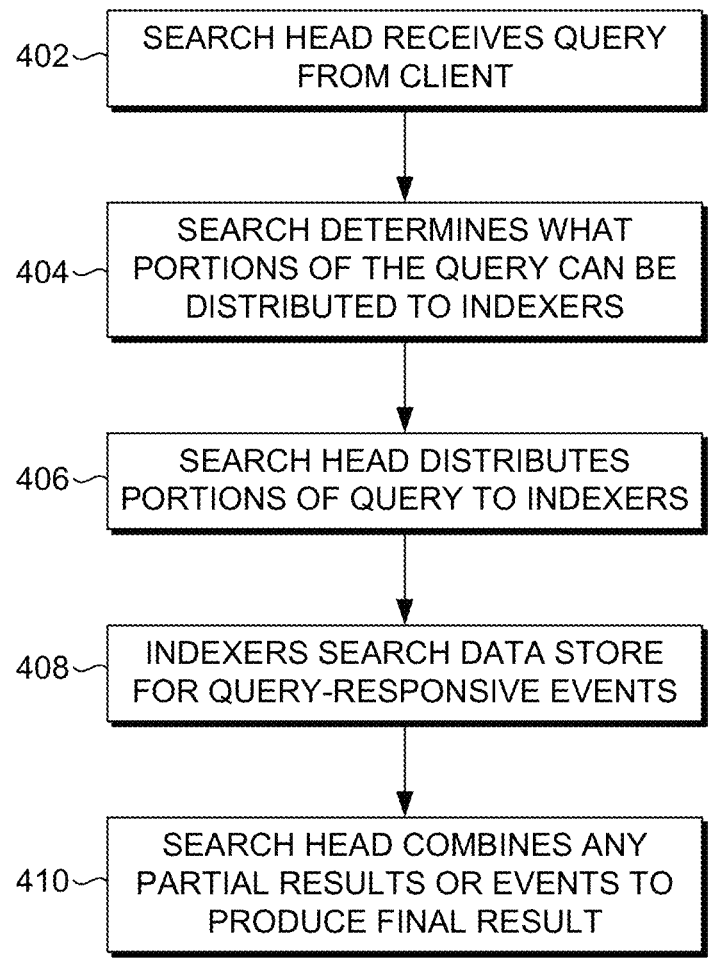
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
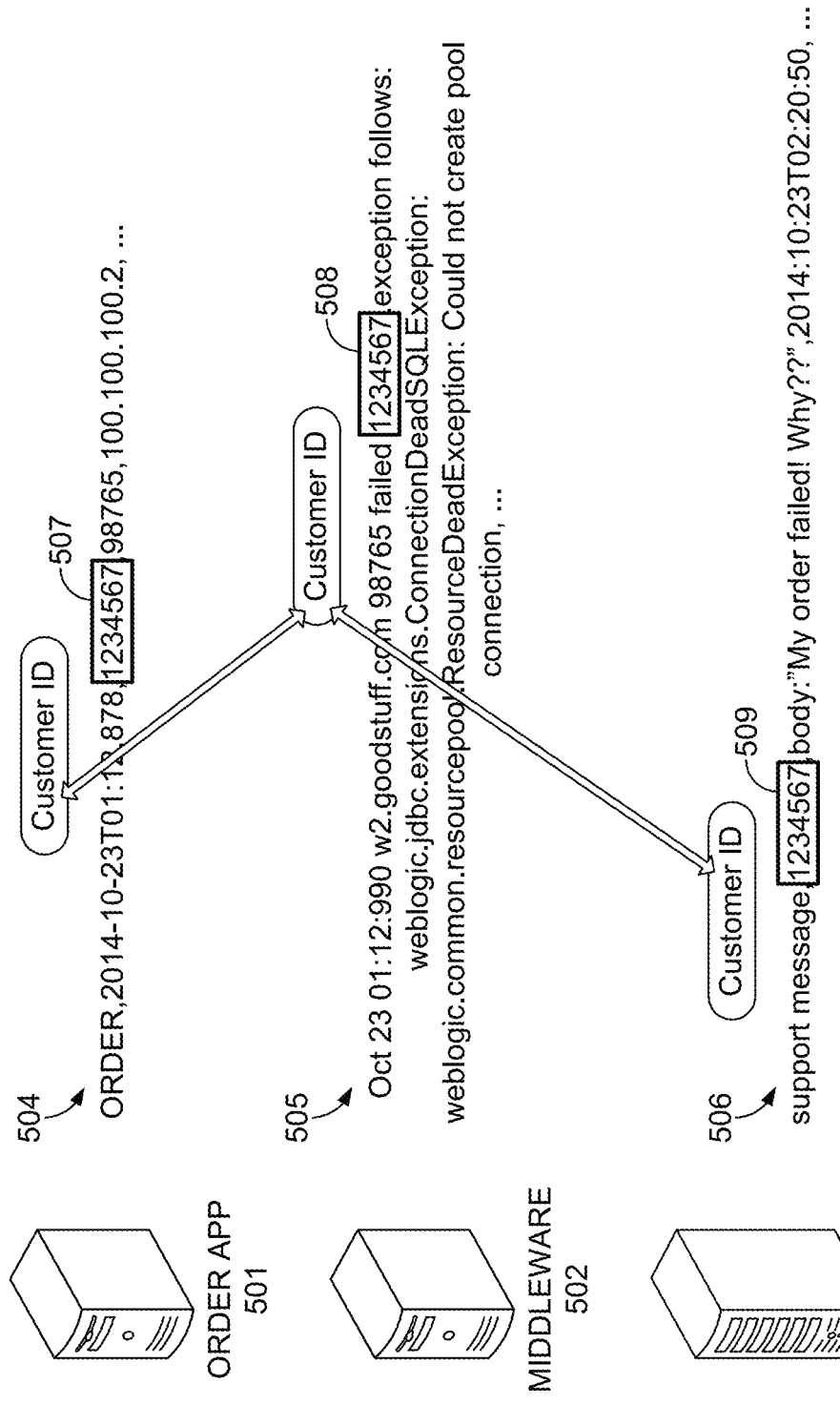
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
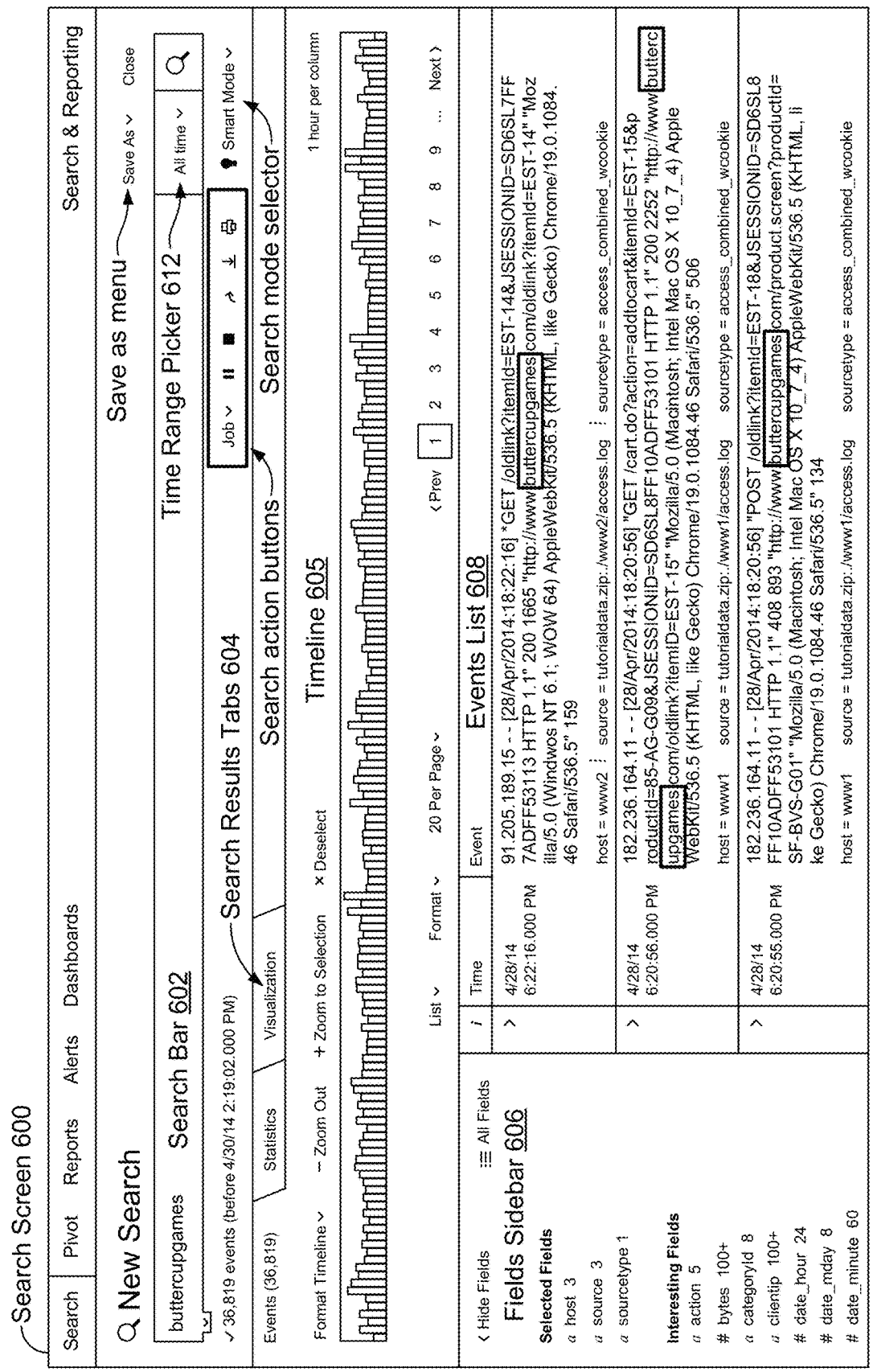
FIG. 6A illustrates a search screen in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar., 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
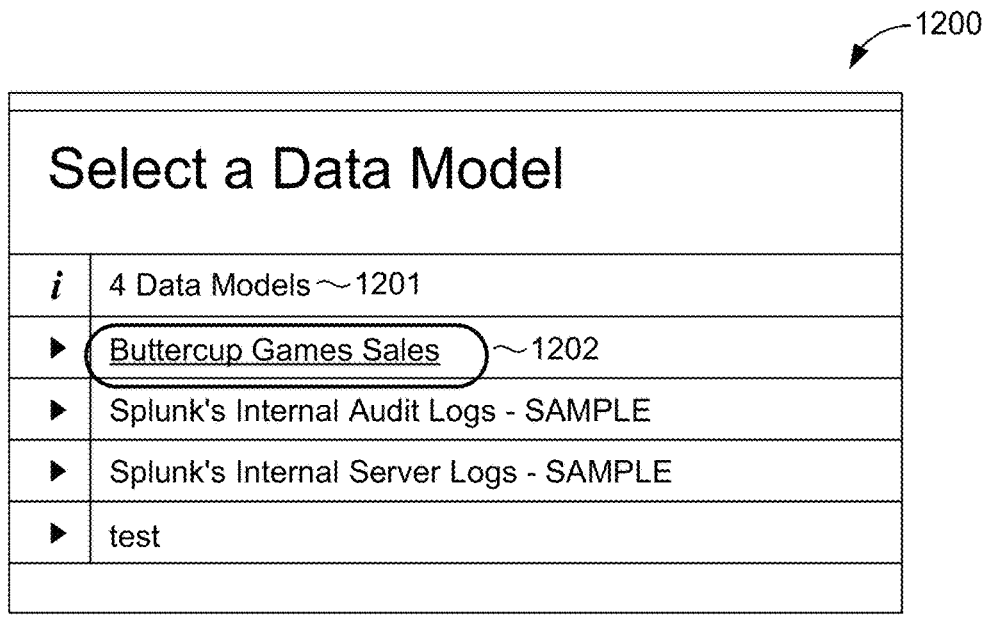
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
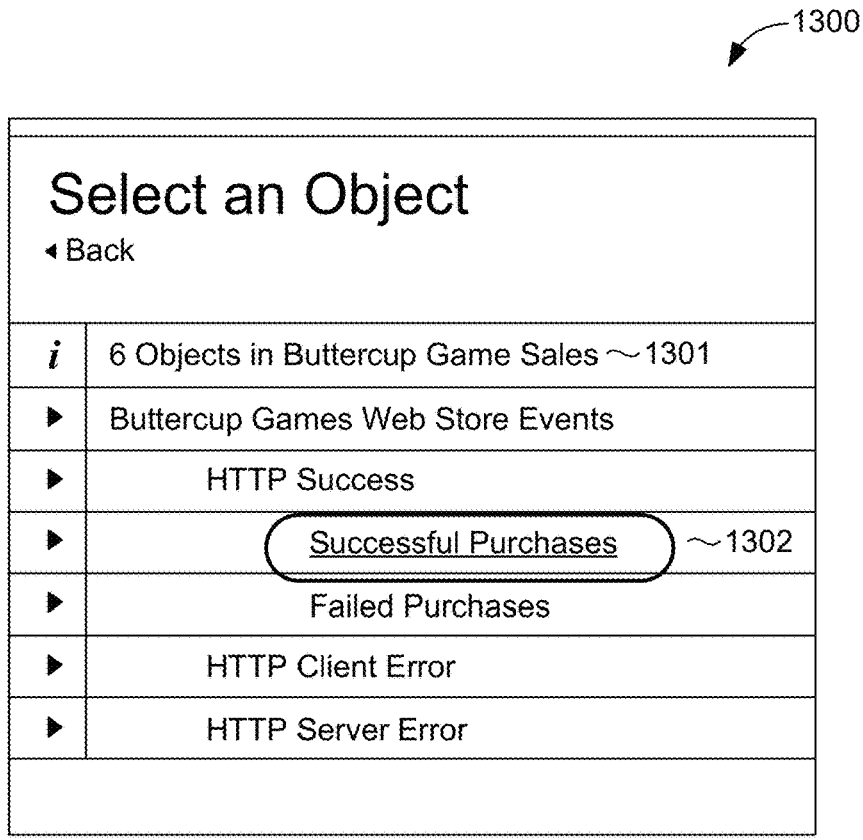

FIG. 13 illustrates an example data model object selection graphical user interface 1300 that displays available data objects 1301 for the selected data object model 1202. The user may select one of the displayed data model objects 1302 for use in driving the report generation process.

Figure 7A:
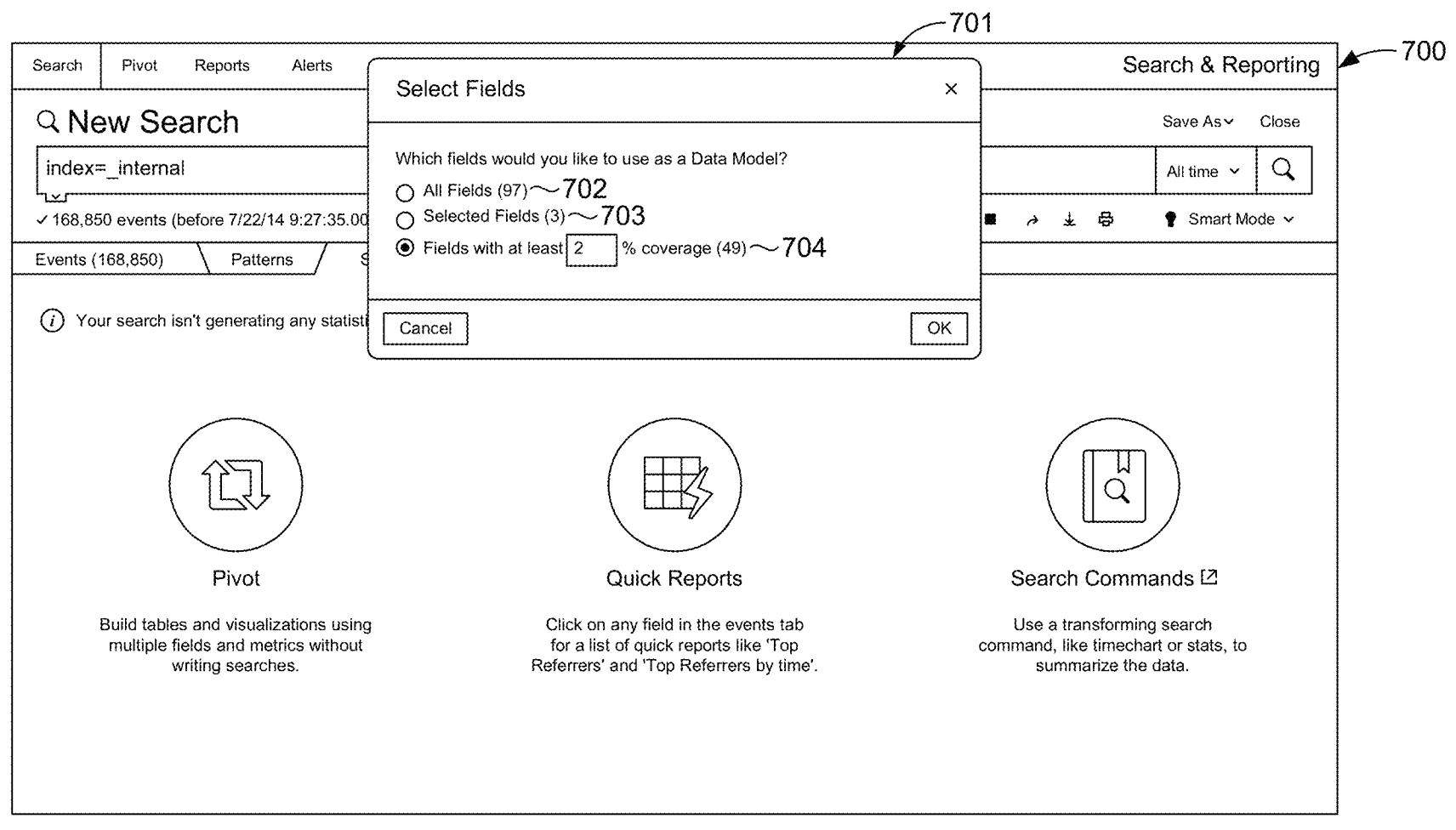

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
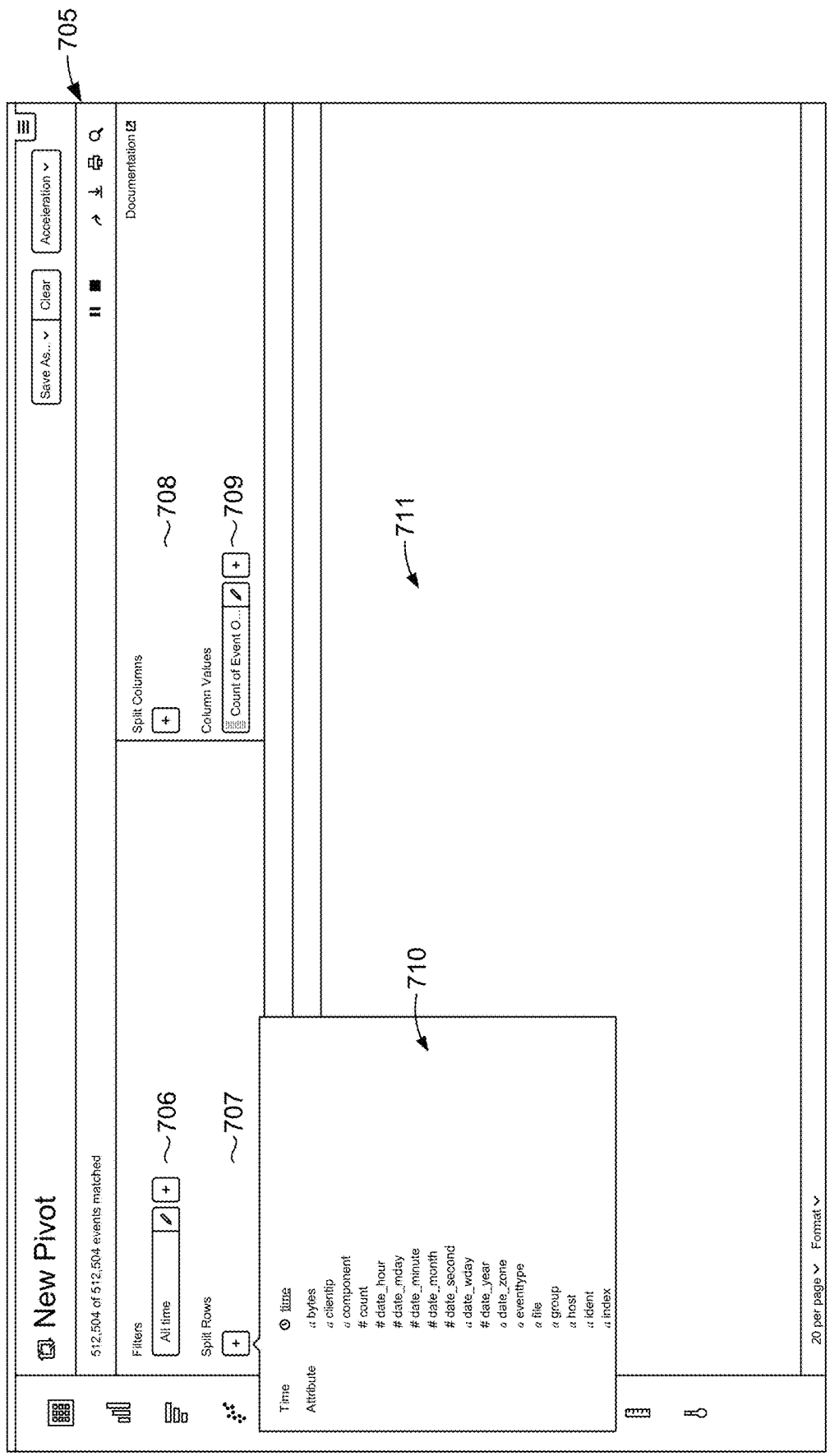
Figure 7C:
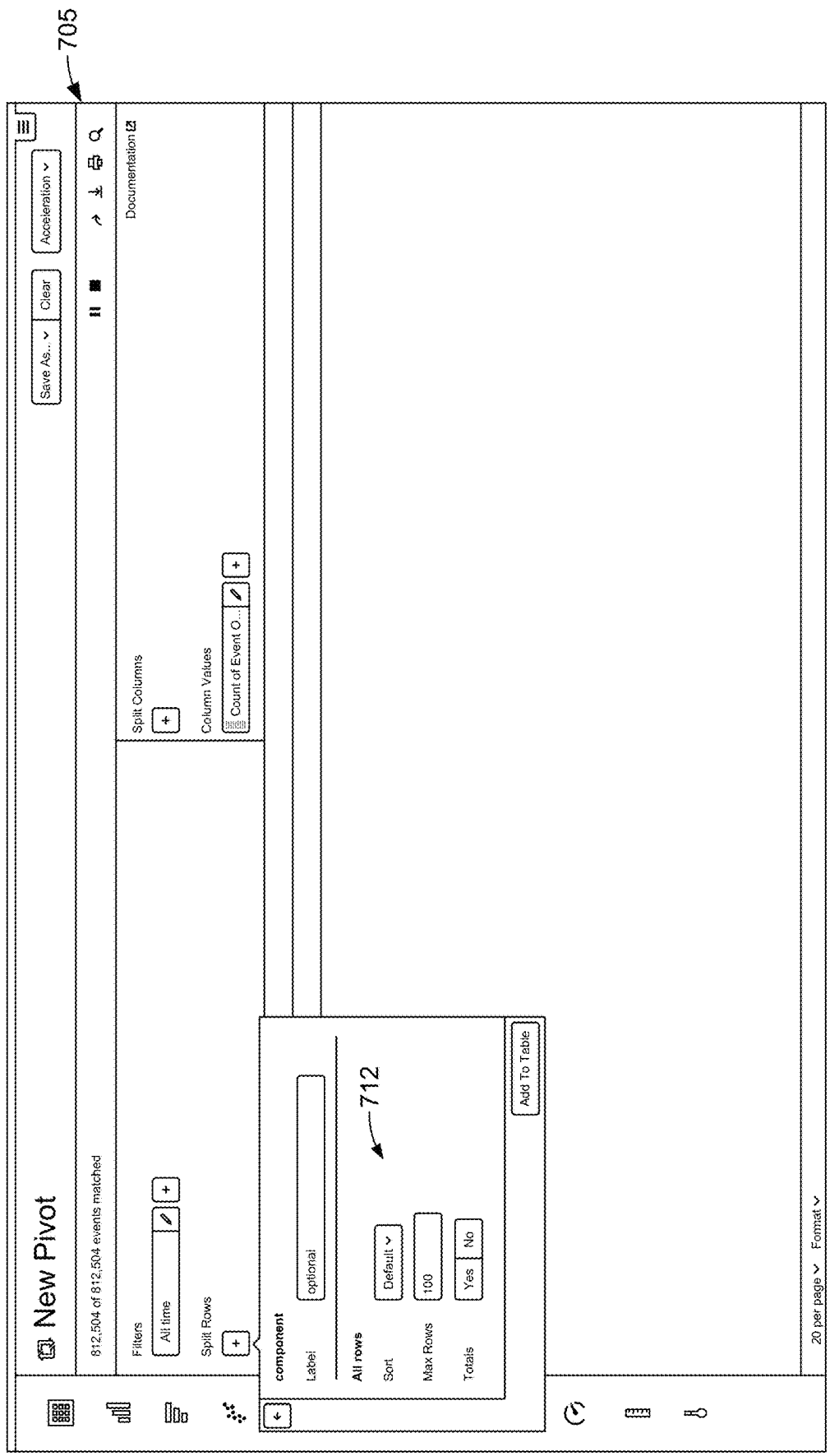

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
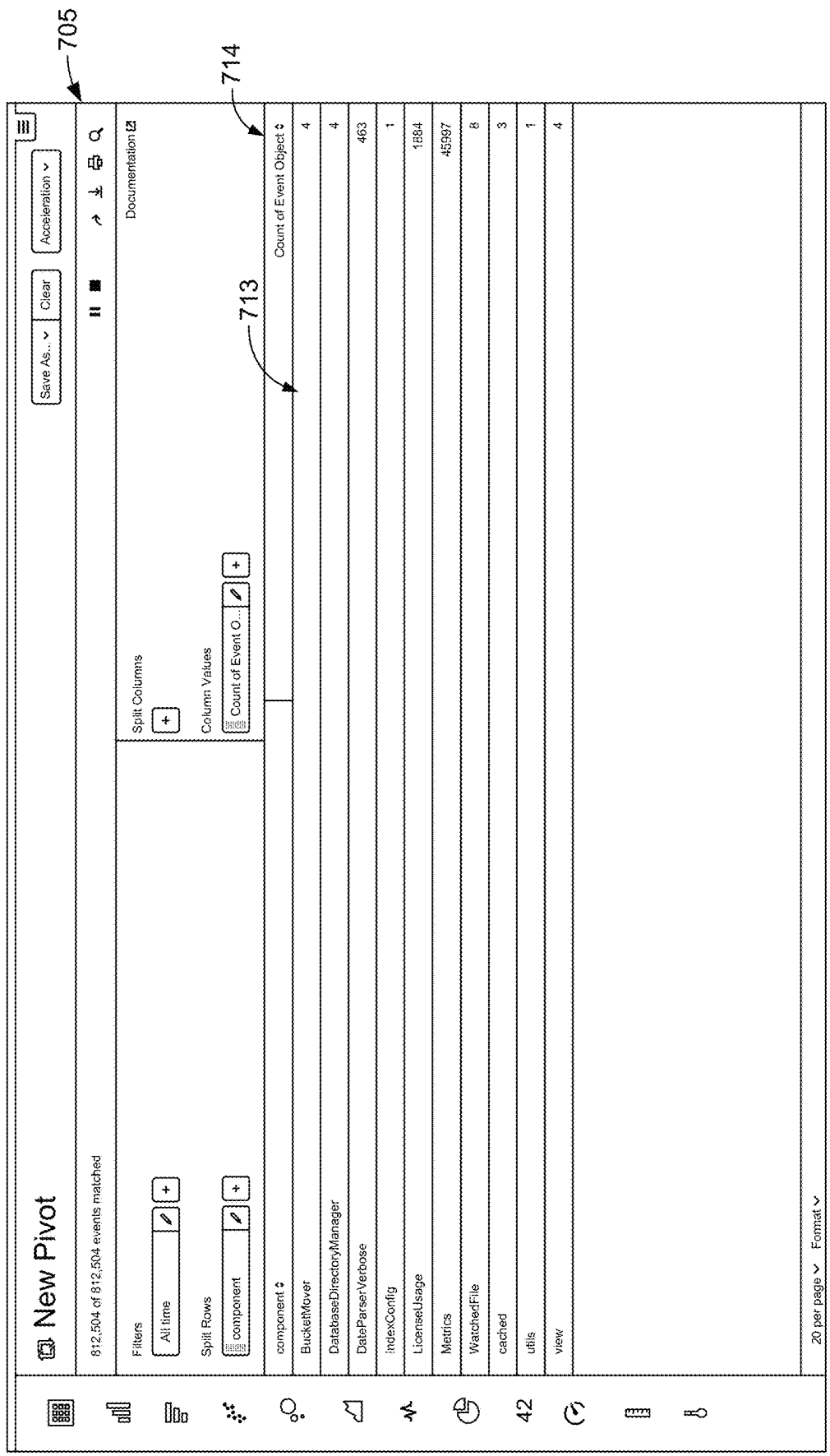

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:
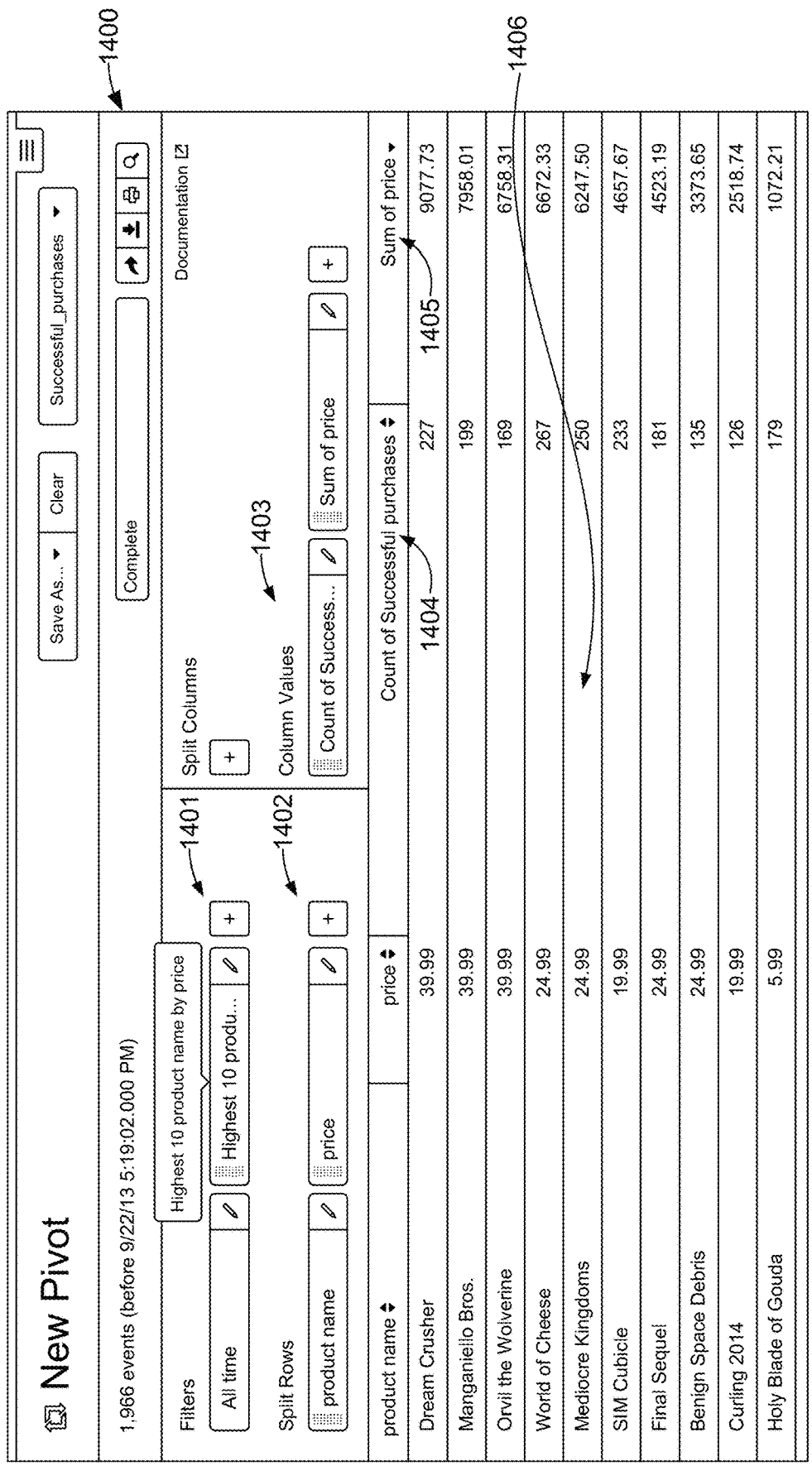

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values

1403. A count of the number of successful purchases for each product is displayed in column 1404. These statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 16:
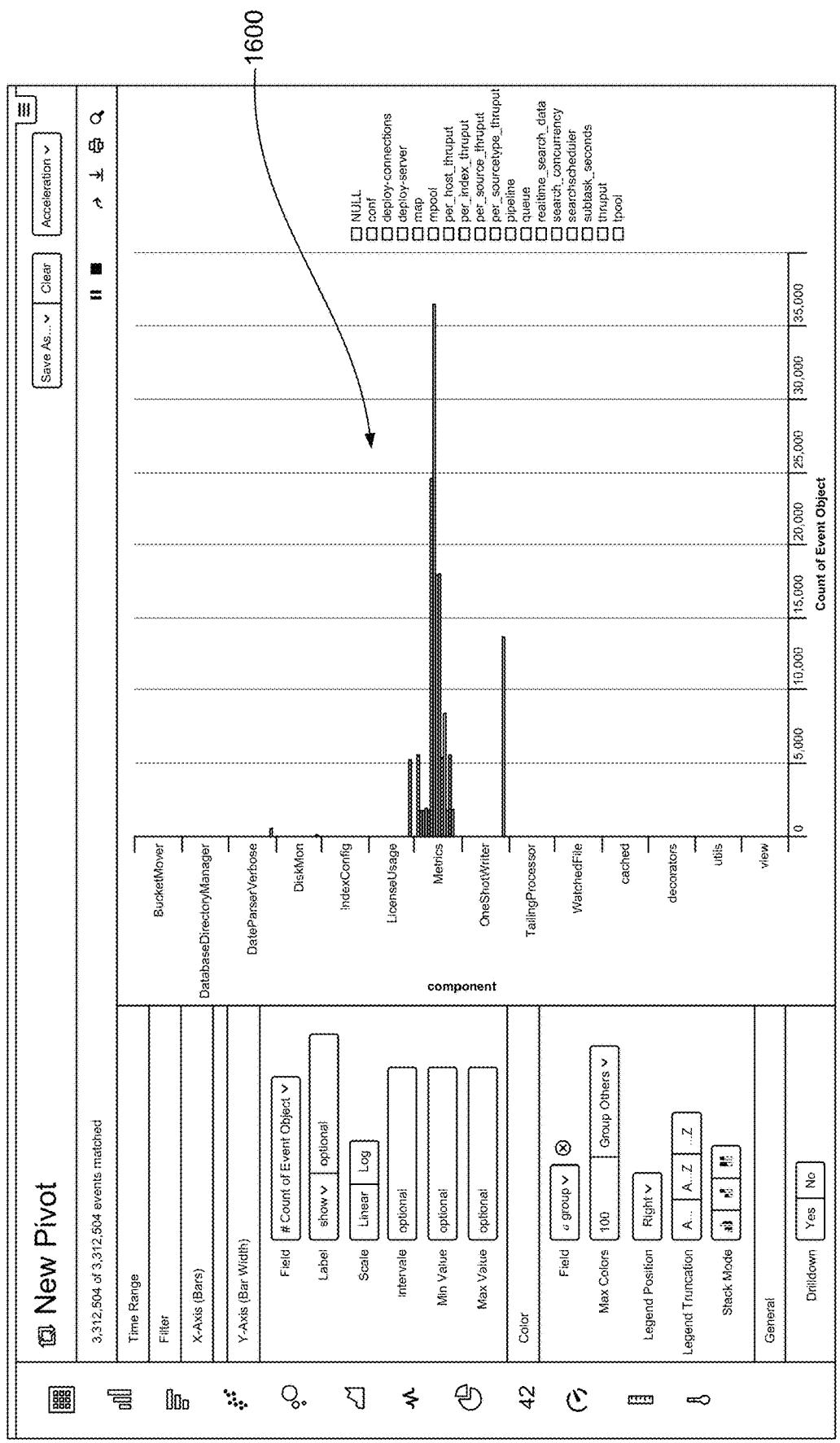
Figure 17:
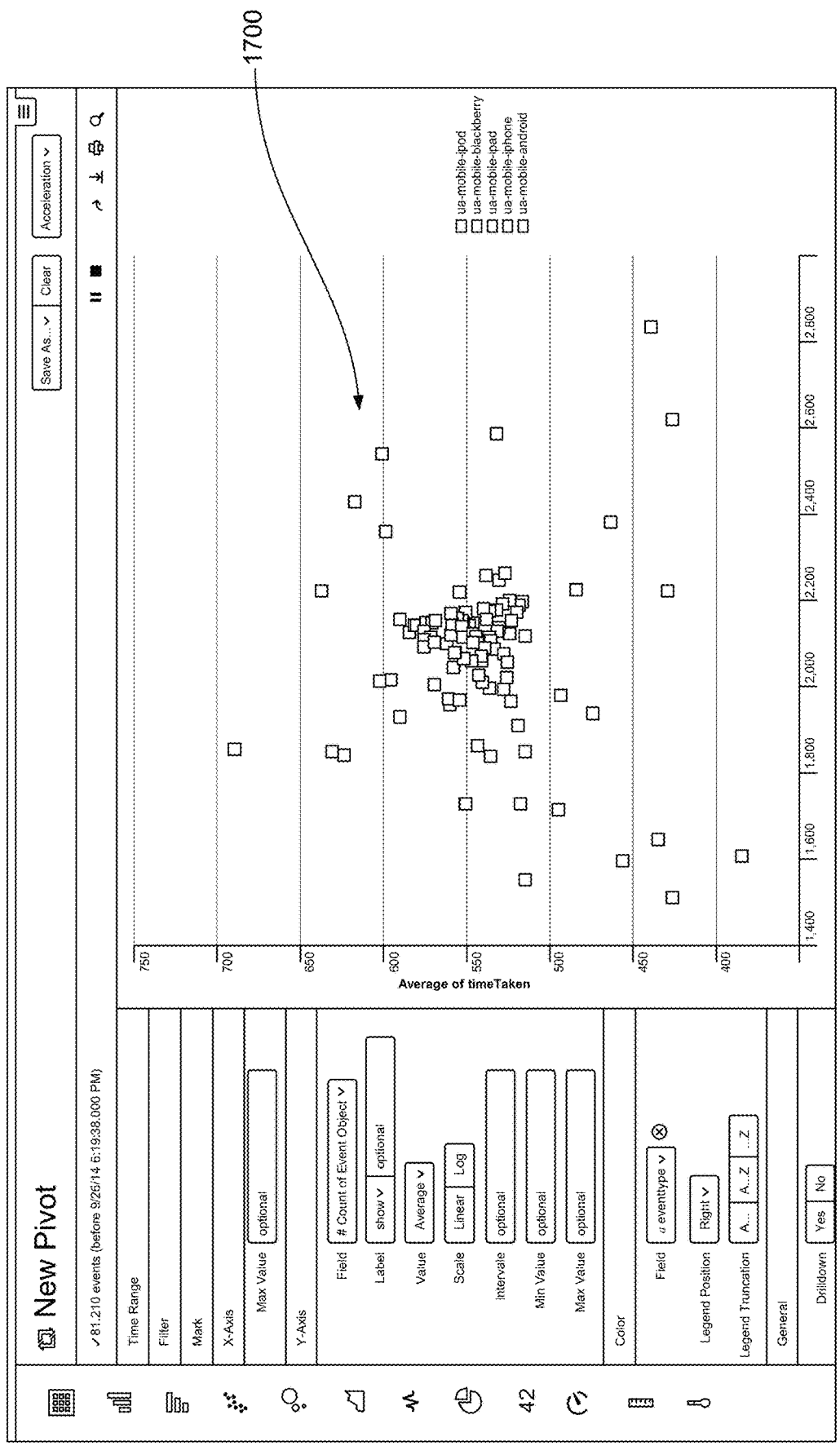

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
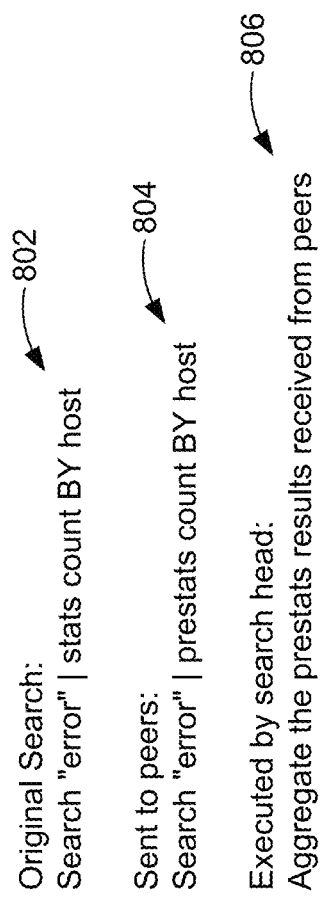
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
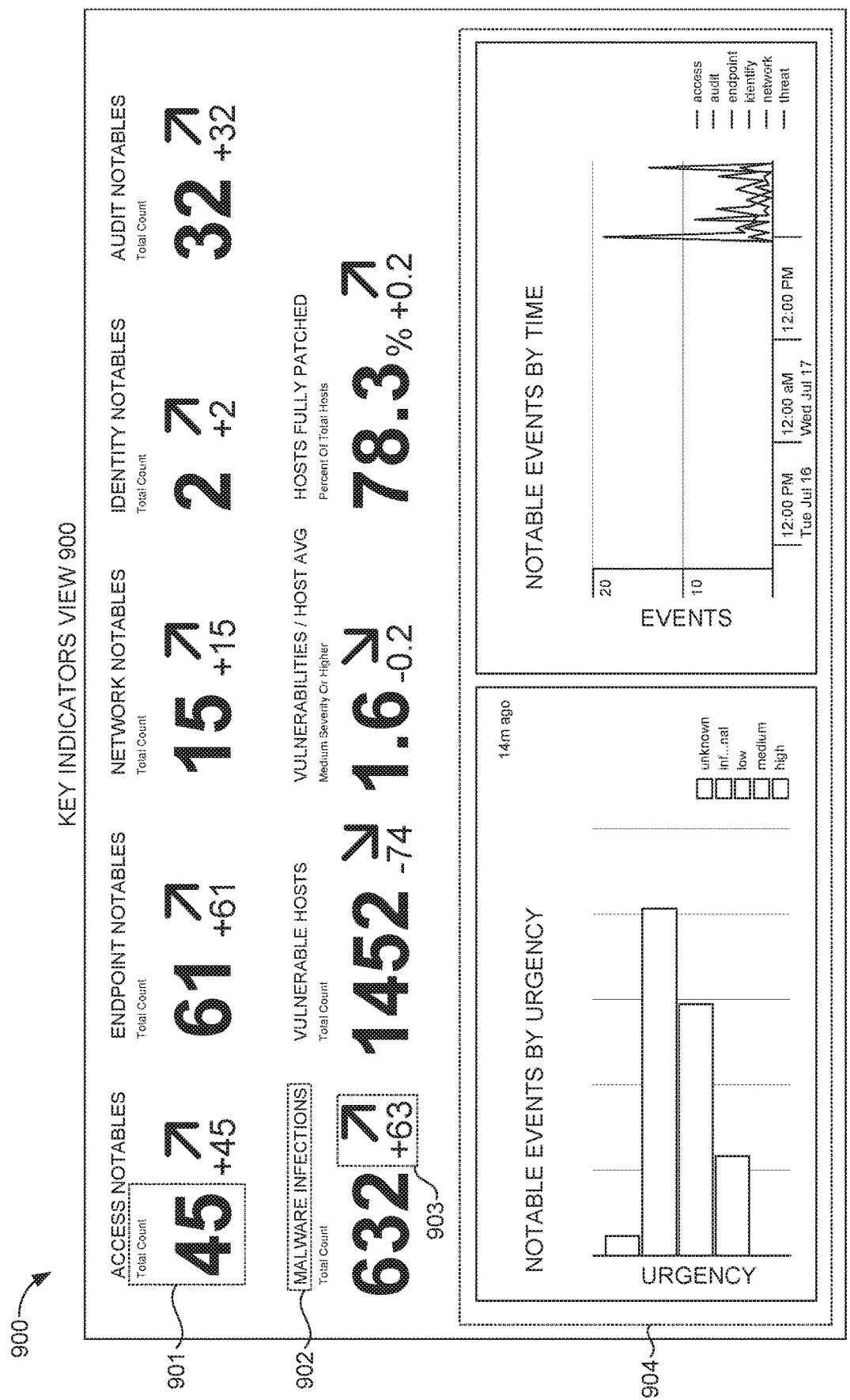
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
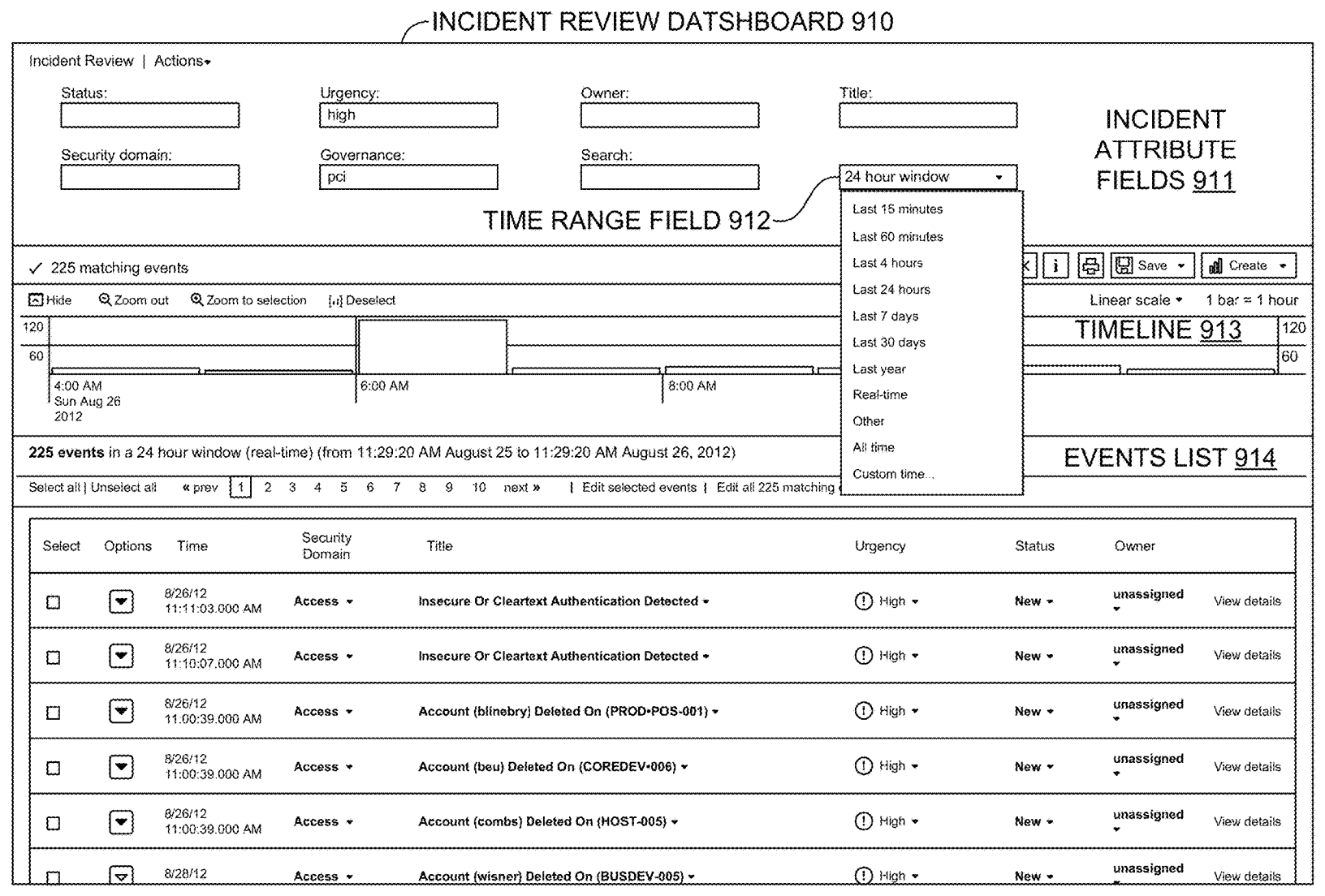

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
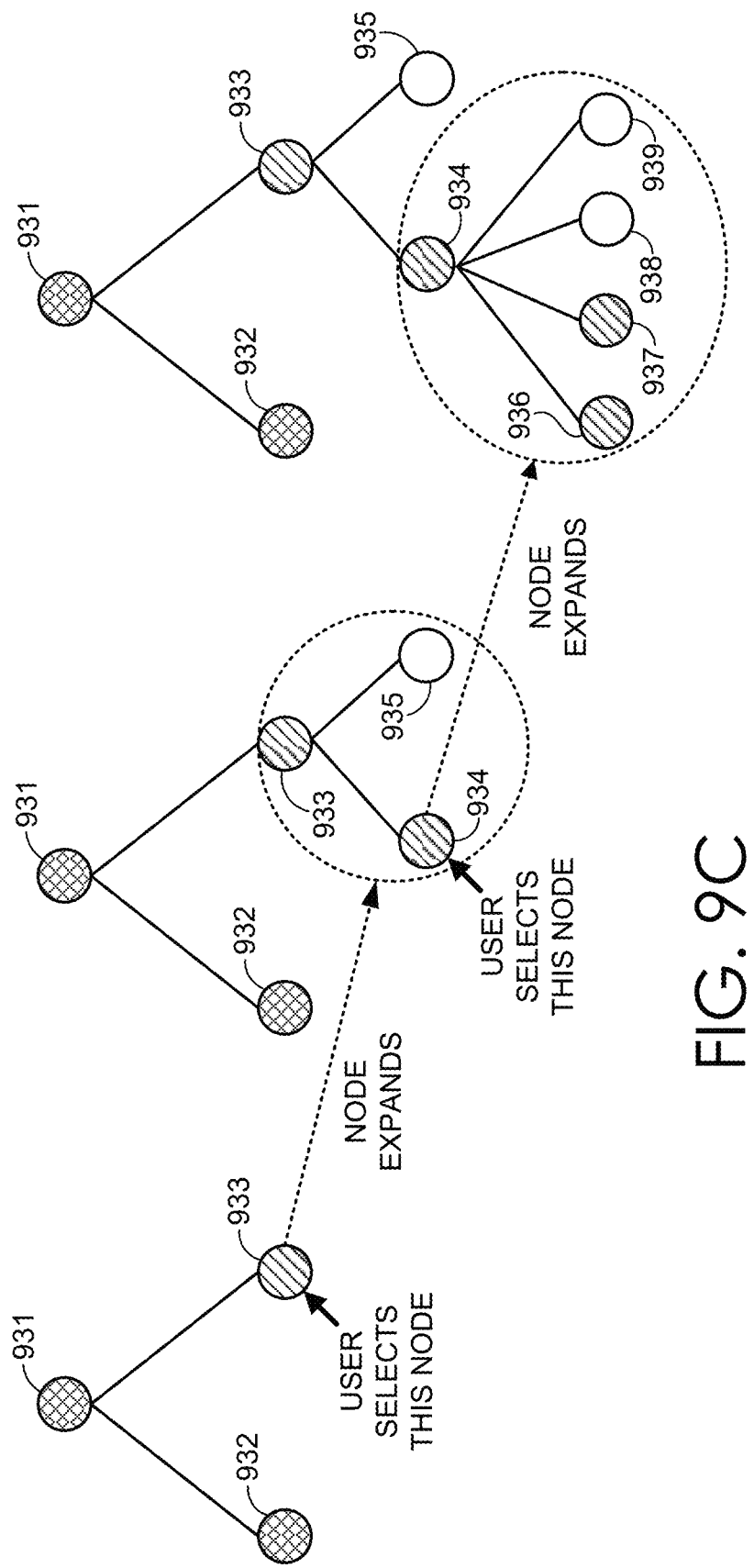
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
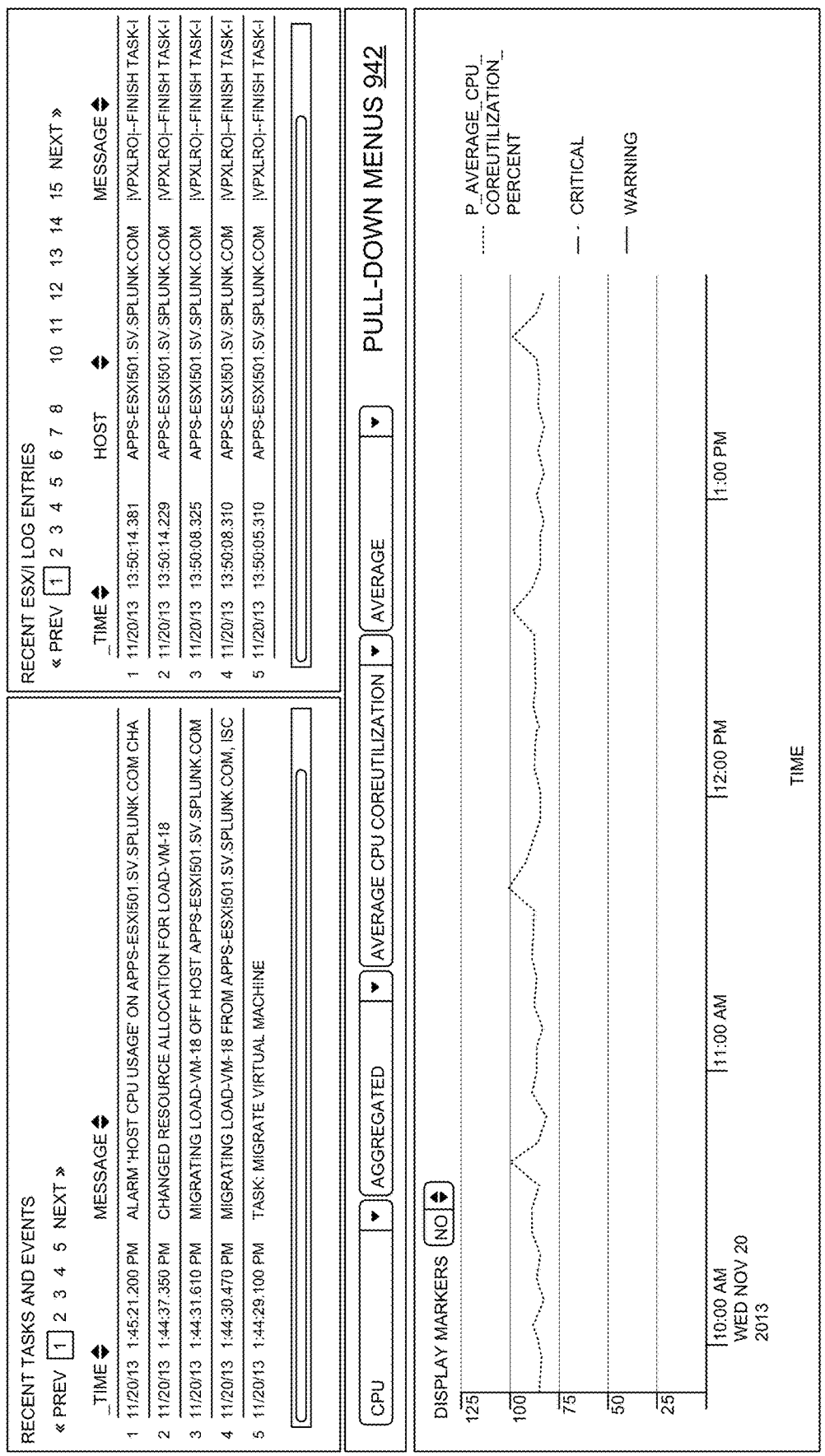
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
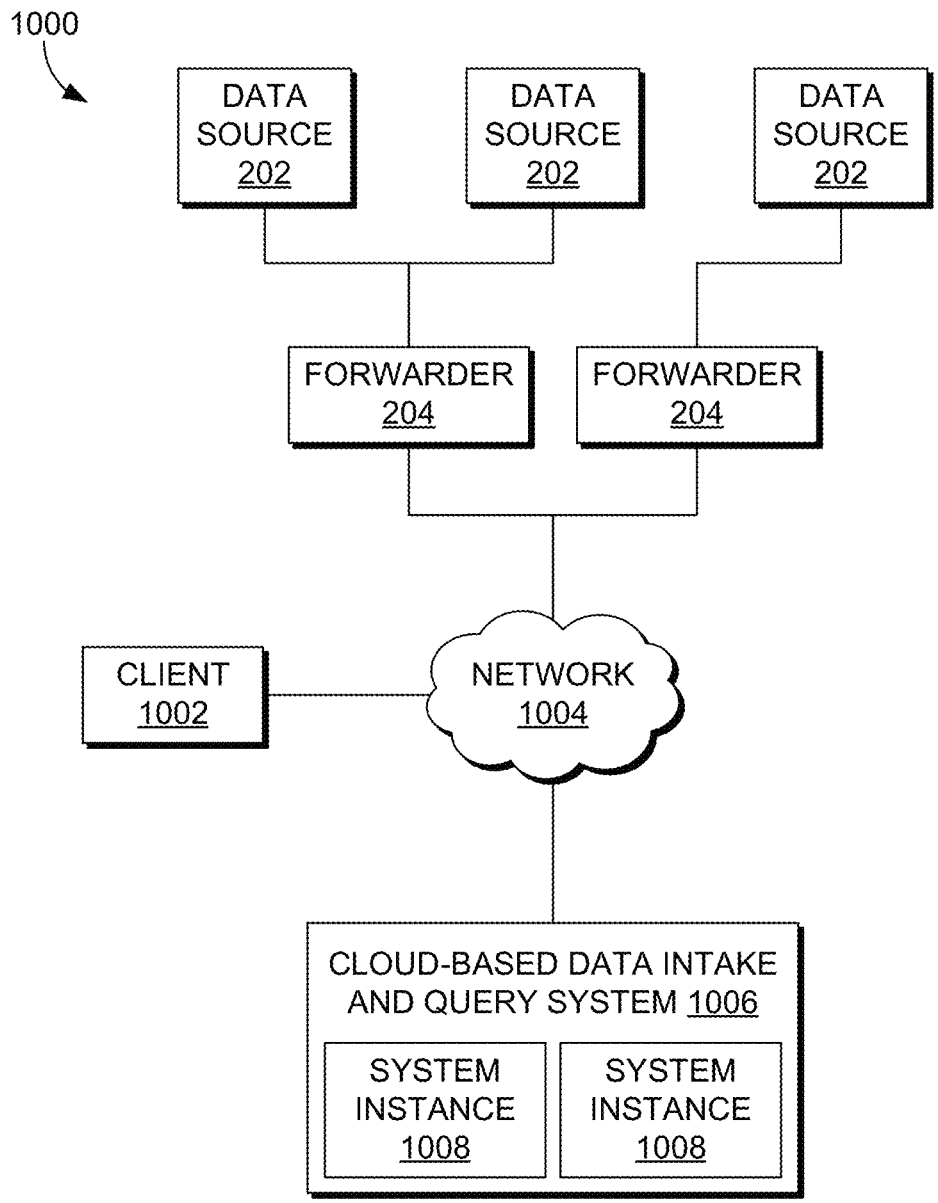
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
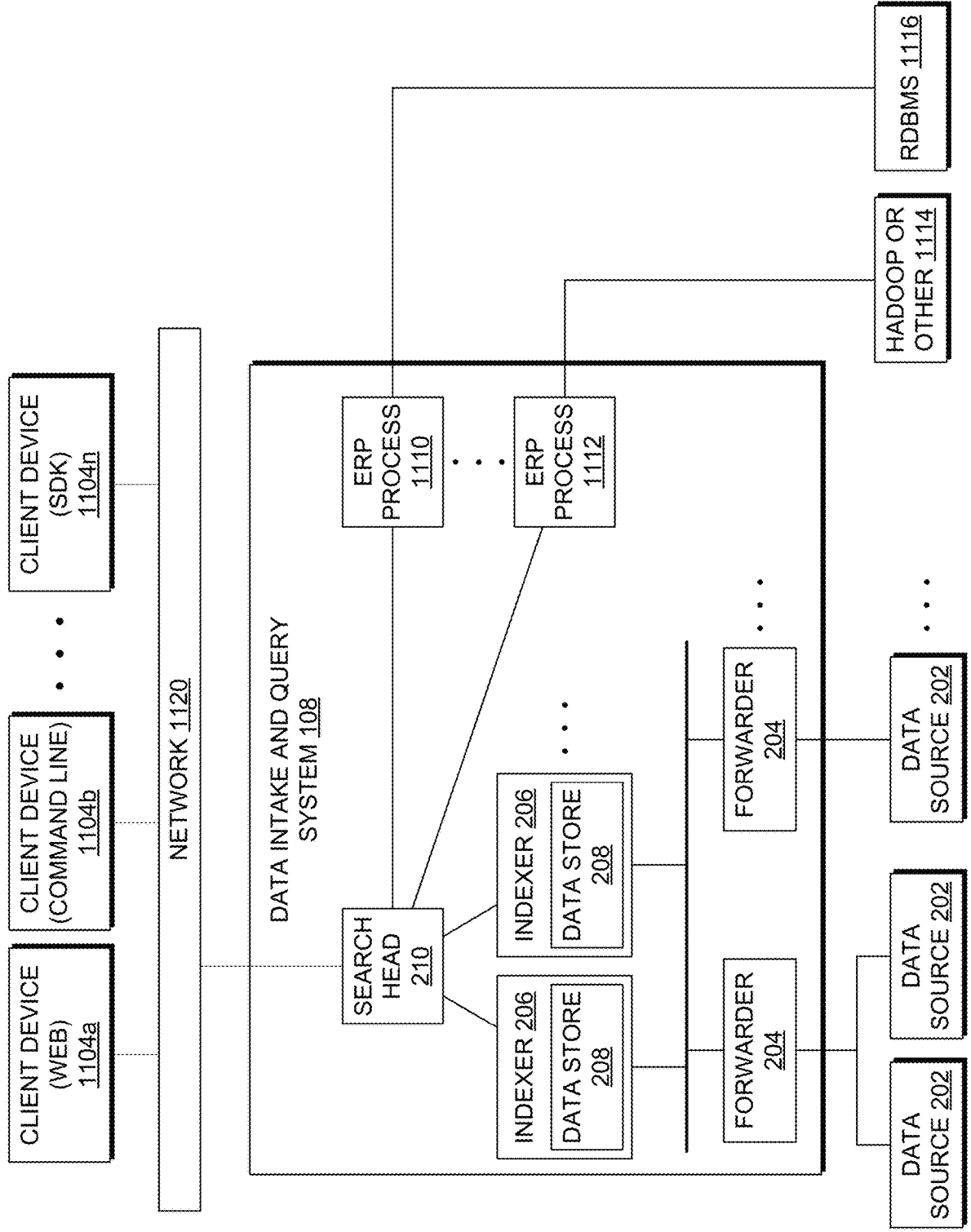
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' warning, 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Overview of Distributed Data Processing

Machine learning models are frequently generated to perform data analysis. In this regard, machine learning models can be generated and, thereafter, utilized to analyze data to identify useful information or results, such as predictions, categorizations, clusters, statistics, or the like. Machine learning models can enable users, such as analysts, to produce reliable or accurate decisions or results through learning from historical relationships and trends in data.

Training and utilizing machine learning models, however, can consume an immense amount of resources, such as memory and CPU resources. Oftentimes, the performance of such machine learning operations is limited to the available resources. Further, in many cases, multiple operations (e.g., additional searches or scheduled searches) are being performed using the same resources, thereby further limiting the available resources. For example, assume a single server is utilized to run machine learning operations as well as perform other search operations. The efficiency of executing multiple operations on the server is generally limited to the resources available via the server. As the number of operations, the complexity of operations, and/or the amount of data increases, the execution efficiency will decrease.

Accordingly, embodiments described herein are directed to facilitating distribution of data to an external computing service in an effort to distribute or offload performance of computations, such as, for example, machine learning operations. For example, in instances that a single server is configured to execute various operations, particular operations, such as machine learning operations, can be performed by an external or remote computing service. Distributing data processing to an external computing service can reduce processing delays due to resources limitations and thereby enable more efficient execution of operations.

To efficiently and effectively facilitate distribution of data processing to an external computing service, embodiments described herein can generate an execution plan in light of operations associated with each command to be performed by an external computing service. In particular, upon identifying operations associated with each command of a query to be performed by an external computing service, the collective set of operations can be analyzed to identify a manner in which to efficiently and effectively process the data externally. Based on the analysis, an execution plan indicating an approach for processing the data at an external computing service is generated and provided to the external computing service. In this way, the external computing service performing the processing has the instructions needed to perform each operation associated with the desired commands within the query, or portion thereof. Accordingly, an iterative approach of communicating a sequence of commands associated with a query to an external computing service is not utilized, thereby improving data processing efficiency. Further, the appropriate data needed for performing external processing for a sequence of commands can be aggregated and communicated to the external computing service prior to performing the external data processing to alleviate the need to transfer data back and forth between a data-processing system and external computing service.

3.1 Overview of a Distributed Data Processing Environment

Figure 18:
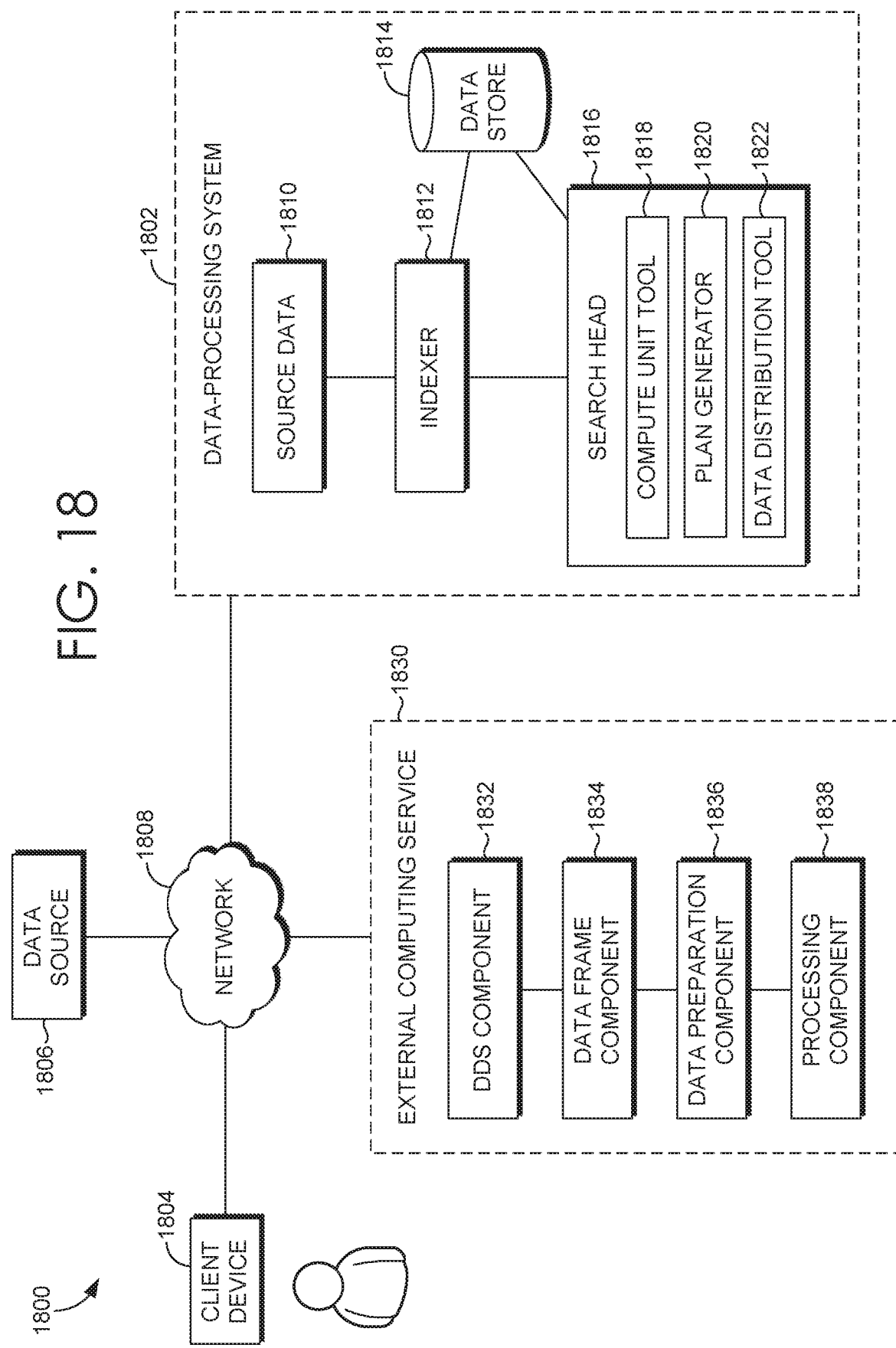
FIG. 18 depicts a block diagram of an illustrative distributed data processing environment in accordance with various embodiments of the present disclosure.

FIG. 18 illustrates an example distributed data processing environment 1800 in accordance with various embodiments of the present disclosure. Generally, the distributed data processing environment 1800 refers to an environment that provides for, or enables, the management, storage, retrieval, preprocessing, processing, and/or analysis of data performed in a distributed manner. As shown in FIG. 18, the distributed data processing environment includes a search head 1816 used to facilitate data distribution, for instance, to external computing service 1830. The search head 1816 can identify and prepare data for distribution to the external computing service 1830, among other things.

In some embodiments, the environment 1800 can include a data-processing system 1802 communicatively coupled to one or more client devices 1804 and one or more data sources 1806 via a communications network 1808. The network 1808 may include an element or system that facilitates communication between the entities of the environment 1800. The network 1808 may include an electronic communications network, such as the Internet, a local area network (LAN), a wide area network (WAN), a wireless local area network (WLAN), a cellular communications network, and/or the like. In some embodiments, the network 1808 can include a wired or a wireless network. In some embodiments, the network 1808 can include a single network or a combination of networks.

The data source 1806 may be a source of incoming source data 1810 being fed into the data-processing system 1802. A data source 1806 can be or include one or more external data sources, such as web servers, application servers, databases, firewalls, routers, operating systems, and software applications that execute on computer systems, mobile devices, sensors, and/or the like. Data source 1806 may be located remote from the data-processing system 1802. For example, a data source 1806 may be defined on an agent computer operating remote from the data-processing system 1802, such as on-site at a customer's location, that transmits source data 1810 to data-processing system 1802 via a communications network (e.g., network 1808).

Source data 1810 can be a stream or set of data fed to an entity of the data-processing system 1802, such as a forwarder (not shown) or an indexer 1812. In some embodiments, the source data 1810 can be heterogeneous machine-generated data received from various data sources 1806, such as servers, databases, applications, networks, and/or the like. Source data 1810 may include, for example raw data, such as server log files, activity log files, configuration files, messages, network packet data, performance measurements, sensor measurements, and/or the like. For example, source data 1810 may include log data generated by a server during the normal course of operation (e.g. server log data). In some embodiments, the source data 1810 may be minimally processed to generate minimally processed source data. For example, the source data 1810 may be received from a data source 1806, such as a server. The source data 1810 may then be subjected to a small amount of processing to break the data into events. As discussed, an event generally refers to a portion, or a segment of the data, that is associated with a time. And, the resulting events may be indexed (e.g., stored in a raw data file associated with an index file). In some embodiments, indexing the source data 1810 may include additional processing, such as compression, replication, and/or the like.

As can be appreciated, source data 1810 might be structured data or unstructured data. Structured data has a predefined format, wherein specific data items with specific data formats reside at predefined locations in the data. For example, data contained in relational databases and spreadsheets may be structured data sets. In contrast, unstructured data does not have a predefined format. This means that unstructured data can comprise various data items having different data types that can reside at different locations.

The indexer 1812 of the data-processing system 1802 receives the source data 1810, for example, from a forwarder (not shown) or the data source 1806, and can apportion the source data 1810 into events. An indexer 1812 may be an entity of the data-processing system 1802 that indexes data, transforming source data 1810 into events and placing the results into a data store 1814, or index. An indexer 1812 may perform other functions, such as data input and search management. In some cases, forwarders (not shown) handle data input, and forward the source data 1810 to the indexers 1812 for indexing.

During indexing, and at a high-level, the indexer 1812 can facilitate taking data from its origin in sources, such as log files and network feeds, to its transformation into searchable events that encapsulate valuable knowledge. The indexer 1812 may acquire a raw data stream (e.g., source data 1810) from its source (e.g., data source 1806), break it into blocks (e.g., 64K blocks of data), and/or annotate each block with metadata keys. After the data has been input, the data can be parsed. This can include, for example, identifying event boundaries, identifying event timestamps (or creating them if they don't exist), masking sensitive event data (such as credit card or social security numbers), applying custom metadata to incoming events, and/or the like. Accordingly, the raw data may be data broken into individual events. The parsed data (also referred to as "events") may be written to a data store, such as an index or data store 1814.

The data store 1814 may include a medium for the storage of data thereon. For example, data store 1814 may include non-transitory computer-readable medium storing data thereon that is accessible by entities of the environment 1800, such as the corresponding indexer 1812 and the search head 1816. As can be appreciated, the data store 1814 may store the data (e.g., events) in any manner. In some implementations, the data may include one or more indexes including one or more buckets, and the buckets may include an index file and/or raw data file (e.g., including parsed, timestamped events). In some embodiments, each data store is managed by a given indexer that stores data to the data store and/or performs searches of the data stored on the data store. Although certain embodiments are described with regard to a single data store 1814 for purposes of illustration, embodiments may include employing multiple data stores 1814, such as a plurality of distributed data stores 1814.

As described, events within the data store 1814 may be represented by a data structure that is associated with a certain point in time and includes a portion of raw machine data (e.g., a portion of machine-generated data that has not been manipulated). An event may include, for example, a line of data that includes a time reference (e.g., a timestamp), and one or more other values. In the context of server log data, for example, an event may correspond to a log entry for a client request and include the following values: (a) a time value (e.g., including a value for the date and time of the request, such as a timestamp), and (b) a series of other values including, for example, a page value (e.g., including a value representing the page requested), an IP (Internet Protocol) value (e.g., including a value for representing the client IP address associated with the request), and an HTTP (Hypertext Transfer protocol) code value (e.g., including a value representative of an HTTP status code), and/or the like. That is, each event may be associated with one or more values. Some events may be associated with default values, such as a host value, a source value, a source type value and/or a time value. A default value may be common to some of all events of a set of source data.

In some embodiments, an event can be associated with one or more characteristics that are not represented by the data initially contained in the raw data, such as characteristics of the host, the source, and/or the source type associated with the event. In the context of server log data, for example, if an event corresponds to a log entry received from Server A, the host and the source of the event may be identified as Server A, and the source type may be determined to be "server." In some embodiments, values representative of the characteristics may be added to (or otherwise associated with) the event. In the context of server log data, for example, if an event is received from Server A, a host value (e.g., including a value representative of Server A), a source value (e.g., including a value representative of Server A), and a source type value (e.g., including a value representative of a "server") may be appended to (or otherwise associated with) the corresponding event.

In some embodiments, events can correspond to data that is generated on a regular basis and/or in response to the occurrence of a given activity. In the context of server log data, for example, a server that logs activity every second may generate a log entry every second, and the log entries may be stored as corresponding events of the source data. Similarly, a server that logs data upon the occurrence of an error may generate a log entry each time an error occurs, and the log entries may be stored as corresponding events of the source data.

In accordance with events being stored in the data store 1814, the search head 1816 can function to process received queries. Queries can be received at the search head 1816 in response to queries initiated at client devices, such as client device 1804. For example, a query can be initiated by a user of the client device 1804. The client device 1804 may be used or otherwise accessed by a user, such as a system administrator or a customer. A client device 1804 may include any variety of electronic devices. In some embodiments, a client device 1804 can include a device capable of communicating information via the network 1808. A client device 1804 may include one or more computer devices, such as a desktop computer, a server, a laptop computer, a tablet computer, a wearable computer device, a personal digital assistant (PDA), a smart phone, and/or the like. In some embodiments, a client device 1804 may be a client of the event processing system 1802. In some embodiments, a client device 1804 can include various input/output (I/O) interfaces, such as a display (e.g., for displaying a graphical user interface (GUI), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 1804 can include general computing components and/or embedded systems optimized with specific components for performing specific tasks. In some embodiments, a client device 1804 can include programs/applications that can be used to generate a request for content, to provide content, to render content, and/or to send and/or receive requests to and/or from other devices via the network 1808. For example, a client device 1804 may include an Internet browser application that facilitates communication with the data-processing system 1802 via the network 1808. In some embodiments, a program, or application, of a client device 1804 can include program modules having program instructions that are executable by a computer system to perform some or all of the functionality described herein with regard to at least client device 1804. In some embodiments, a client device 1804 can include one or more computer systems similar to that of the computer system 2400 described below with regard to at least FIG. 24.

The query can be initiated at the client device 1804, for example, via a search graphical user interface (GUI). In some embodiments, the data-processing system 1802 can provide for the display of a search GUI. Such a search GUI can be displayed on a client device 1804, and can present information relating to initiating data analysis, performing data analysis, viewing results of data analysis, providing data analysis notifications, and/or the like.

A query can be initiated at a client device by a user at any time. In this regard, a user may initiate a query in accordance with performing a search for information. By way of example only, a query might be initiated based on a user selection of a machine learning assistant (e.g., presented via a GUI) that guides a user through workflow of a machine learning application. In embodiments, the query is provided in the form of a search processing language that includes search commands and corresponding functions, arguments, and/or parameters.

Upon the search head 1816 receiving a search query, the search query can be processed. In this regard, the search head 1816 can analyze the query to identify whether to initiate external data processing. Identifying whether to initiate external data processing can be performed in any number of ways. In some embodiments, the received query may include an external processing indicator that provides an indication to initiate or trigger external data processing. For example, a query may include a particular term (e.g., "sparkml"), syntax, command, combination thereof, or other external processing indicator to indicate or specify external data processing. A query having an external processing indicator may be followed (or preceded) by a set of commands desired to be performed by the external computing service. By way of example only, a query may include:

Externalml [sfit PCA field1 field2 field3 | sfit LinearRegression target_field from feature1 feature2 PCA_1 PCA_2 PCA_3]
wherein "Externalml" may be an external processing indicator indicating that the subsequent commands listed between brackets [ ] are commands desired to be performed at an external computing service.

Additionally or alternatively, the search head 1816 may determine to initiate external data processing, for example, based on a criteria or threshold (e.g., data set size, field(s) cardinality, current processing utilization, number of concurrent operations being performed, etc.). For example, in cases that a data set exceeds a threshold size (e.g., a predetermined number of events), a determination to utilize an external computing service may be made. As another example, in cases that a field or set of fields has exceeds a threshold number of distinct field values, the search head 1816 may make a determination to utilize an external computing service.

In accordance with making a determination (e.g., using an external processing indicator) to distribute data processing to an external computing service, the search head 1816 can facilitate obtaining appropriate data for processing data at the external computing service 1830. In particular, the search head 1816 can facilitate identification of a data set and an external processing execution plan, which can then be provided to the external computing service 1830 for performing the data analysis. In embodiments, an external processing execution plan associated with a sequence of commands in a query and corresponding input data are identified prior to being communicated to the external computing service for processing. Advantageously, identifying an external processing execution plan that encompasses a sequence of commands in a query, as well as identifying the corresponding input data, reduces the amount of communications required between the data-processing system 1802 and the external computing service 1820. Accordingly, rather than communicating a first external processing execution plan associated with a first command and corresponding input data to the external computing service, obtaining results from the external computing service, and then proceeding to communicate a second external processing execution plan associated with a second command in the query and corresponding input data to the external computing service, the appropriate data and commands are provided to the external computing service in advance of the external computing service performing the processing such that the external computing service has the appropriate data and instructions needed to perform processing.

In embodiments, to facilitate external data processing, the search head 1816 includes a compute unit generation tool 1818, a plan generator 1820, and a data distribution tool 1822. Although illustrated as separate components, the functionality described in association with the compute unit generation tool 1818, the plan generator 1820, and the data distribution tool 1822 can be provided via any number of tools, components, or modules. Further, although compute unit generation tool 1818, plan generator 1820, and data distribution tool 1822 are illustrated as integrated with search head, as can be appreciated, such tools may be provided in any number of configurations (e.g., separate from the search head in the data-processing system).

The compute unit generation tool 1818 is generally configured to generate compute units in association with commands. A compute unit is a unit of computation that indicates an operation (atomic operation) that can be performed via the external computing service. To this end, a compute unit contains necessary information to execute a command, such as a machine learning command (e.g., fit and/or apply). In some embodiments, one or more compute units can be determined for a command within a query. To identify one or more commands within the query, the query can be parsed. The command(s) for which a compute unit(s) is generated may be based on, for example, commands within a subquery or subsearch, or portion of a query. For example, a compute unit(s) may be generated for each command within a subquery designated by a particular bracket set or other indicator, such as commands following an external processing indicator. In other implementations, a compute unit(s) may be generated for each command within the query. Upon determining compute units associated with selected commands within the query, the compute units can be aggregated as a collection, set or graph of compute units for the query. That is, the set of compute units includes indications of the operations to be performed via the external computing service. A collection, set, or graph of compute units is generally referred to herein as a graph of compute units or a compute unit graph. As described more full below, by aggregating the compute units, the set of compute units can be collectively analyzed to optimize performance of the operations. Upon determining a compute unit(s) for each command in a sub-search (e.g., commands in the query to be performed by an external computing service), the graph of compute units can be communicated to the plan generator 1820. By providing the compute units related to a particular query, or subquery, to the plan generator 1820 collectively, the plan generator 1820 can efficiently optimize execution of the commands in the query and reduce the amount of communication required between the data-processing system and the external computing service.

Figure 19:
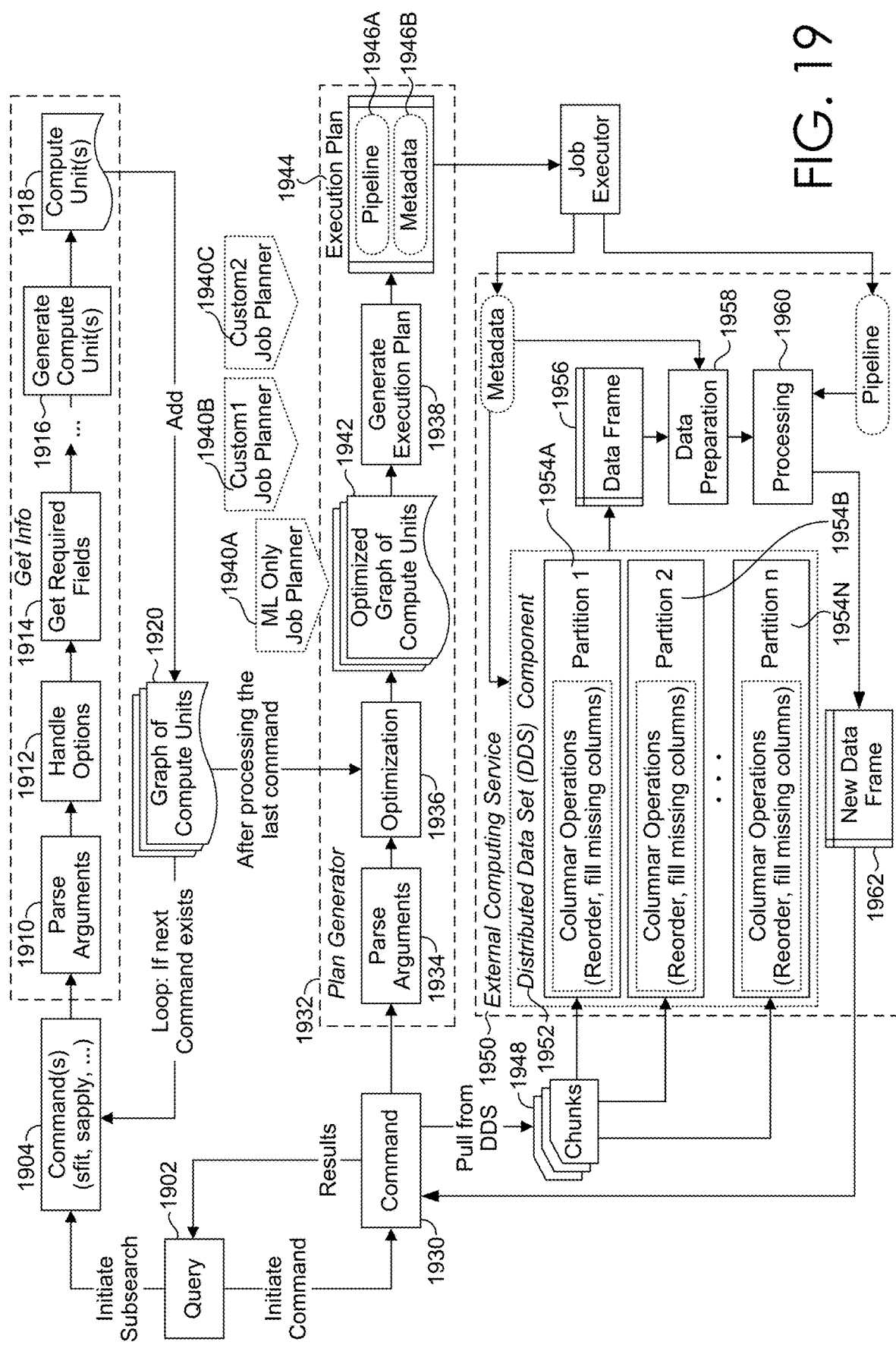
FIG. 19 illustrate an exemplary embodiment of a distributed data processing environment of the present disclosure.

A compute unit(s) associated with a command can be determined in any number of ways. FIG. 19 illustrates one exemplary implementation for generating a compute unit for an identified command (e.g., a machine learning command, such as fit or apply). As illustrated in FIG. 19, one process includes parsing arguments 1910, handling options 1912, obtaining fields 1914, and using such data to generate a compute unit(s) 1916. Assume that a query 1902 is received. Further assume that, upon analyzing the received query, a set of commands 1904 (e.g., machine learning commands) to be processed at an external computing service is detected. For each such command, a compute unit(s) can be determined. In particular, at block 1910, the query can be parsed to identify an argument(s) associated with a command. By way of example only, assume a machine learning fit command corresponds with a parameter of k=5. In such a case, the parameter k=5 can be parsed into a key-value pair as an argument. At block 1912, options associated with generating compute units can be handled. By way of example only, assume that an option for cross validation is set for the command "sfit." In such a case, rather than generating one compute unit, a set of compute units that can potentially be executed in parallel can be generated. Various options to execute commands may exist, for example, based on a particular argument specified. At block 1914, fields, such as required fields, associated with a particular command are obtained. In one example, in machine learning, a set of obtained fields may include all target variables and feature variables for a machine learning command. A feature variable refers to variable used to predict a target variable. In some cases, a feature variable might be a generated target variable from a previous command.

At block 1916, a compute unit(s) is generated for the command. Generally, a compute unit includes an indication of an operation or set of operations to perform in association with a command. By way of example only, assume a command to be performed by the external computing service is a linear regression command. In such a case, various compute units associated with a linear regression command can be generated. For example, a first compute unit may be removing empty columns, a second compute unit may be dropping null values, a third compute unit may be converting strings to numeric data, and a fourth compute unit may be to run linear regression. Although this example illustrates each of these steps as separate compute units, as can be appreciated, any combination of steps may be aggregated in a single compute unit. In embodiments, a particular step or set of steps may be determined to be in a compute step based on organizational purposes. That is, in optimizing operations, a compute unit can include a step that can be used to optimize an operation. For instance, if two operations exist for a command and the order of executing such operations can be optimized, the operations may be separated into different compute units.

In embodiments, a compute unit can be generated using identified arguments, options, and fields. By way of example only, options may be used to facilitate generation of the compute unit. For instance, a command(s) may have a preset rule for generating a compute unit based on an option(s). Further, identified arguments and/or fields can be included in the compute unit.

A compute unit(s) 1918 generated in association with a command can be aggregated as a graph of compute units 1920 associated with a query, or subquery. By way of example only, assume a subquery includes a first fit command (e.g., PCA) and a second fit command (e.g., linear regression). Assume that two compute units are generated for the first command, and three compute units are generated for the second command. The two compute units generated for the first command and the three compute units generated for the second command can be aggregated or combined into a graph of compute units for the query such that the graph of compute units includes five compute units. Upon determining a compute unit(s) for each command in the set of commands 1904 (e.g., commands in the query to be performed by an external computing service), the graph of compute units 1920 can be communicated to the plan generator 1932.

Returning to FIG. 18, the plan generator 1820 is generally configured to generate an execution plan in association with a query, or portion thereof. An execution plan generally refers to a plan for executing a query, or portion thereof, at an external computing service, such as external computing service 1830. As can be appreciated, an execution plan may be represented as a graph, in which case compute units can represent the nodes of the graph. The plan generator 1820 can parse arguments, within a query, associated with performing external data processing. For example, arguments may include an indication of an amount of CPU to utilize, an amount of memory to utilize for a particular search, etc. In this way, arguments regarding target resources to use and amounts of data desired to be returned can be parsed from the query. Such arguments may be included in the query prior to or subsequent to a subquery associated with an external computing service.

Upon obtaining the graph of compute units, the plan generator 1820 can optimize the compute units. Optimizing compute units generally refers to performing optimization of an order, merger, aggregation, etc. of compute units such that the query, or portion thereof, is executed more optimally at the external computing service. As one example, assume a fit PCA machine learning command is included in a subquery along with a specification of fields F1 and F2, and a fit linear regression machine learning command is included in the subquery along with a specification of fields F2 and F3. In order to perform machine learning, string values are converted to numeric values. Rather than converting field F2 from a string format to a numerical value two separate times (in association with the fit PCA command and the linear regression command), the compute units can be merged such that field F2 is only converted from a string format to a numerical value one time. As another example, assume five compute units exist in a graph of compute units. The plan generator 1820 can analyze each of the five compute units to optimize the compute units. Upon identifying two compute units having a same type of operation (e.g., converting to double), the plan generator 1820 can identify whether the compute units are operating on a same field. If so, one of the compute units can be removed from the graph of compute units. If not operating on a same field, the compute units may be merged so the operation can be performed on the two fields at one time. Further, the compute units can be reordered, for example, based on the particular operations being performed. For instance, a compute unit associated with a filter operation may be moved to the beginning of the processing order (e.g., to reduce the amount of data being operated on). Another optimization may include parallel execution. In analyzing the compute units, if a set of compute units do not depend on each other (e.g., the compute units take different inputs, and, as such, do not utilize the output of previous process as input) and can run in parallel, the compute units can be optimized to execute in parallel. As can be appreciated, in some embodiments, the plan generator 1820 may provide an interface such that users can customize generation of execution plans, such as optimization preferences. For instance, a user may prefer to optimize compute units based on memory consumption or execution time.

Based on the identified optimization, an optimized graph of compute units is created. Such an optimized graph of compute units can be used to generate an execution plan. An execution plan generally represents an optimized graph of compute units. As such, an execution plan may be, in some embodiments, a graph indicating compute units and relationships thereof. An execution plan includes a set of metadata and an external command pipeline, such as machine learning pipeline. The external command pipeline may be an ordered list of operation instructions, or functions, that can be executed on an external computing service. By way of example only, assume four compute units exist with the optimized graph of compute units. In such a case, the external command pipeline may be an ordered list of operation instructions. The external command pipeline may be in the form of a graph or tree structure, in some implementations. In embodiments, an external command pipeline may include data preprocessing operations and processing (e.g., machine learning) operations. Advantageously, in embodiments, such an external command pipeline can include each operation to be executed at the external computing service in accordance with the query, or subquery. Accordingly, each command in the query, or subquery, to be executed remotely can be efficiently executed at the external computing service in response to the execution plan without requiring additional communication between the data-processing system and the external computing service. That is, a pipeline of commands can be optimized so an iteration of communication between the data-processing system and external computing service is not needed for each command within the query, or portion thereof.

The set of metadata includes data used for data preparation, as discussed in more detail below. To this end, metadata may include required fields, target variable, and feature variables, for example. The parsed arguments can be used as parameters of the machine learning algorithm. For example, for Kmeans, a K values need to be specified to determine the number of clusters.

Upon the search head 1816 detecting an indication to process data external to the data-processing system 1802, the search head 1816 can also initiate the data distribution tool 1822. The data distribution tool 1822 can function to facilitate data distribution, for example, to external computing service 1830. In some implementations, the data distribution tool 1822 may be initiated upon determining a graph of compute units for a query or subquery. In other implementations, the data distribution tool 1822 may be initiated concurrently with, or prior to, determining a graph of compute units for a query or subquery. The data distribution tool 1822 is generally configured to facilitate distribution of data to the external computing service 1830.

The data distribution tool 1822 is generally configured to collect and facilitate distribution of data for performing external data processing. The data distribution tool 1822 can collect data, for example, from the data store 1814 and/or indexer 1812 based on a query, such as a query input by a user at client device 1804. For example, the indexers to which the query, or portion thereof, was distributed, can search data stores associated with them for events that are responsive to the query. To determine which events are responsive to the query, the indexer can search for events that match the criteria specified in the query. These criteria can include matching data sources, keywords or specific values for certain fields. The searching operations may use the late-binding schema to extract values for specified fields from events at the time the query is processed. In an embodiment, one or more rules for extracting field values may be specified as part of a source type definition. The indexers and/or data stores may then either send the relevant events back to the search head 1816, or use the events to determine a partial result, and send the partial result back to the search head 1816.

The search head 1816 can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

Although generally described herein as performing a search for data upon the events being created, indexed, and stored, a search can be defined and/or applied before or as events are created, indexed, and/or stored. Further, a search may be automatically triggered. For example, upon initially establishing a search, a subsequent data search, or portion thereof may be automatically triggered and performed as new data is received, upon a lapse of a time duration, or the like.

In embodiments, a data set to collect at the data distribution tool 1822 may include a set of events having raw data and a timestamp. In some embodiments, a data set may be a training data set. A data set to access may be selected in any number of ways. In one embodiment, a user may select or designate a data set for which data processing is to be applied. As one example, a search query may be input that includes an indication of a training data set for which data processing and/or machine learning model generation is desired. As another example, a training data set can be selected from among data sets. In another embodiment, a training data set to utilize for data processing and/or machine learning model training may be automatically selected or a default training data set. For example, upon a request to predict data (e.g., time series forecasting), an initial training data set can be automatically identified or selected such that it can be processed and used to generate a machine learning model for use in predicting data. In some implementations, a data source (e.g., index) may be specified. Further, the data accessed may be data collected within a certain time frame, such as, data collected within the last 30 days, etc. In some embodiments, a data set to collect may correspond with searches or commands in the query preceding and/or subsequent to commands to be externally executed.

In accordance with identifying a data set, the data distribution tool 1822 can collect appropriate data for use in performing data processing. In embodiments, the data can be referenced or accessed from the data store 1814, for example. In cases that a query is used to specify an initial training data set to use, the query can be parsed to identify a data set and any corresponding parameters or options relating to the data set. In accordance with parsing the query, the data matching the query can be accessed or retrieved. In some embodiments, event processing may occur in accordance with accessing an initial data set. In this regard, upon inputting a query indicating a data set, the corresponding events can be processed or analyzed to extract field values (e.g., using data extraction rules) at search time.

Upon accessing an initial data set, the data distribution tool 1822 may collect the data set as input data into an input buffer. In embodiments, the input data can be input into the input buffer as chunks of data. A chunk can include a set of events. An input buffer can be used to set a maximum amount of chunks that can be temporarily stored at the search head and/or asynchronously transmitted to the external computing service. In some embodiments, a buffer size may be configurable through command arguments so that memory consumption and I/O throughput can be controlled for searches.

Identifying and communicating data for performing external data processing can be performed at a data distribution tool, or search head, in any number of ways. FIG. 19 illustrates one exemplary implementation for identifying and communicating data (e.g., a data set and execution plan) to an external computing service. Assume that a query 1902 is received at a search head. Upon determining that external data processing should be performed in association with the query (e.g., an external processing indicator is detected), an external processing command 1930 can be initiated to facilitate distribution of data to an external computing service, such as external computing service 1950.

Accordingly, an input data set 1948 can be collected in an input buffer. Such an input data set may be generated based on any number of commands or searches corresponding with the query 1902. For example, commands or searches in the query not associated with an external processing indicator may be used to generate an input data set. Input data can be collected and/or provided in the form of data chunks. Such data chunks can be raw data, or a raw file, that includes arbitrary data from a set of data. In this regard, a chunked protocol may be used to split data into small pieces or chunks for providing to an external computing service. Chunked data may be in a tabular format, but may not share the same schema. That is, the schema for chunked data may be arbitrary. For instance, the dataflow may be optimized by removing empty columns in chunks to reduce the size of the data. Further, the columns in a data chunk may be in any order as the order of the columns is not guaranteed among chunks. By way of example only, and with reference to FIG. 20A-20D, FIG. 20A illustrates an example of a set of data 2002. As shown, the full set of data 2002 includes column A 2004, column B 2006, and column C 2008. Such a data set 2002 can be chunked or sliced to provide data chunks to an external computing service. For example, data set 2002 can be chunked to provide a data chunk 2010 in FIG. 20B, a data chunk 2020 in FIG. 20C, and a data chunk 2030 in FIG. 20D. As shown, the schema for each of the data chunks 2010, 2020, and 2030 is different.

Further, a plan generator 1932 can be utilized to generate an execution plan for the query, or portion thereof. As illustrated in FIG. 19, one process for generating an execution plan includes parsing arguments 1934, optimizing compute units 1936, and generating an execution plan 1938. To this end, arguments within the query can be parsed at parsing arguments 1934. Optimizing compute units 1936 can analyze a graph of compute units 1920 to determine or identify a manner in which to optimize the graph of compute units, that is, such that the compute units can result in a more efficient or effective operations (e.g., reduce resource utilization, increase processing efficiency, etc.). As can be appreciated, in embodiments, job planners 1940A, 1940B, and/or 1940C can be utilized in determining optimization of compute units. Upon determining a manner in which to optimize compute units, a set of optimized compute units 1942 are generated. The optimized compute units 1942 can then be used to generate an execution plan 1944 at block 1938. As described above, an execution plan 1944 can include an external command pipeline 1946A and a set of metadata 1946B. The plan generator 1932 can then provide the execution plan 1944 to the external computing service 1950, which can utilize the execution plan 1944, along with the input data set 1948 to perform data processing in an efficient manner.

Optimizing compute units and generating an execution plan prior to communicating such a plan to an external computing service can be advantageous. In particular, information that the external computing service may not have can be used to facilitate compute unit optimization and/or execution plan generation. By way of example only, assume two fields of data exist. Further assume that utilizing the compute units, or other information, it is detected that the two fields are the same. In such a case, operations might be merged for optimization. Such an optimization can improve processing that may not otherwise be achieved by an external computing service optimization. For instance, an external computing system may not be able to detect whether the two fields are actually the same and, as such, could not optimize accordingly. As yet another example, it may be determined that execution can be performed in parallel and, as such, multiple jobs can be initiated, as opposed to just one job.

Returning to FIG. 18, the external computing service 1830 is generally configured to perform remote data processing, that is, data processing that is external to the data-processing system 1802. One such exemplary external computing service is Apache Spark, which is an open-source cluster-computing framework. Apache Spark generally provides an API based on a resilient distributed dataset (RDD) data structure. Generally, the external computing service 1830 can utilize the input data set and the execution plan to perform data processing in accordance with a query, or subquery, initiated by a user. In one implementation, the external computing service 1830 may be initiated to perform processing in response to receiving an execution plan that specifies how to execute a plan.

In embodiments, the external computing service 1830 may include a distributed data set (DDS) component 1832, a data frame component 1834, a data preparation component 1836, and a processing component 1838. Although illustrated with such components, as can be appreciated, an external computing service 1830 may include any number or configuration of components.

Upon initiating the external computing service 1830 (e.g., based on reception of data), the distributed data set component 1832 can begin to obtain input data. In this regard, the distributed data set component 1832 may begin pulling data chunks from the data-processing system, for example, via an input buffer. With brief reference to FIG. 20, an example data chunks may be data chunks 2010, 2020, and 2030, of FIGS. 20B-20D, respectively.

The chunks can be pulled to different partitions, which may contain any number of chunks. A partition generally holds or contains part of the data. As can be appreciated any number of partitions may be utilized. Each partition can reside on the same or different nodes such that various operations can be executed in parallel. For example, each partition can correspond with a different physical computer or server (e.g., physically located in different locations).

In embodiments, data chunks can be placed within any partition. As such, a partition may not have consecutive data chunks. By way of example only, assume four data chunks are created from an original data set. Further assume two partitions exist. In such a case, the data chunks can be provided to the two partitions in any order. For instance, a first partition may contain data chunks 1 and 4, while a second partition contains data chunks 2 and 3. An arbitrary placement of data chunks within partitions may occur, for example, as the amount of data may be unknown until all the data is obtained. As can be appreciated, an algorithm may be implemented to allocate chunks within partitions, such that the partitions contain an approximately equal number of data chunks.

In some embodiments, the set of metadata within the execution plan can be provided to the distributed data set 1832. The distributed data set 1832 can analyze the metadata, determine data to obtain, and begin pulling appropriate data chunks. As can be appreciated, in some cases, the desired data may not be included in the input data set. In such a cases, a notification may be provided to a user to enable a user to initiate a search for desired data, or to notify the user that processing cannot be performed. Alternatively, the desired data may be automatically obtained. In this regard, a query may be automatically generated to obtain the desired data and input such data to the external computing service 1830.

In embodiments, as the chunks can include data in a raw format (e.g., csv format), the data can be parsed and converted to a format or data structure. As described herein, the distributed data set component 1832 can utilize a columnar data structure. By way of example only, when using Spark as an external compute system, the distributed data set component 183 can be implemented as SplunkRDD that uses a columnar data structure. As the data chunks obtained generally have different schemas, a columnar data format may be used to perform various operations to generate an acceptable or appropriate format for the external computing service. In this way, a columnar data structure may be used to store input data to efficiently perform various operations and pre-processing steps, such as column reorder, drop columns, and fill missing columns, etc., which are column-based operations. By way of example, and with brief reference to FIG. 20, an external computing service may operate by using data in a format as shown in FIG. 20A. However, as described above, data chunks can be provided to the external computing service in a format as shown in FIGS. 20B-20D (e.g., to improve data flow). Accordingly, to facilitate processing by the external computing service, the distributed data set component 832 can convert the data chunks to a columnar data format or data structure. Such data can then be processed to generate a data set with similar schema (e.g., reorder columns, remove columns, add columns, etc.).

Upon storing data in partitions in a columnar format, the data chunks can be concatenated. As previously described, such data chunks may have a different order of columns, missing columns, etc. As such, columnar-based operations may be performed to generate a data set with a similar schema. For instance, columns may be reordered, columns may be removed, missing columns may be added, or the like. In one implementation, for each partition, the data can be preprocessed, for example, to fill missing columns and place columns in a particular order. Such preprocessing of data can be performed, for instance, in accordance with available metadata operations provided within the execution plan, such as for example, reordering columns, filling missing columns, etc. Each partition may perform data preprocessing to obtain a same data schema across partitions in the distributed data set (e.g., such as RDD). In this regard, upon analyzing data within a partition, data across partitions can be analyzed to ensure a same data schema is used across partitions.

In some cases, performing such columnar operations may occur after all the data chunks are placed in a partition. As can be appreciated, performing operations following reception of all data can facilitate a more efficient and/or accurate set of operations. For example, assume a data set has columns A, B, and C and 100 rows. Further assume that column A has 100 rows, but rows 1-99 are empty and row 100 has data. As such, in performing column-based operations prior to obtaining data in association with row 100, column A might not be detected. However, performing column-based operations following obtaining data in association with row 100, column A can be detected and maintained in the columnar data format. As such, the number of columns and the column order may be unknown until all the data is obtained. Accordingly, metadata associated with the data may be not be determined until all the data is obtained. Such metadata (e.g., number of columns, column names, column data type, etc.) can be provided to the external computing service performing operations.

In embodiments, the external computing service may utilize a row-based API (e.g., a RDD implementation used by Spark). In this regard, the external computing service may desire to access data from the distributed data set component in the form of a row(s). In conventional systems in which data is stored in a row-based manner in a same location, it is generally efficient to retrieve that row. However, as described above, column-based operations are desirable to manipulate the data as may be needed when data is obtained in arbitrary data chunks (e.g., missing columns, reordered columns, etc.). To perform column-based operations on row-based data would be inefficient and time consuming. As such, and as described above, implementations described herein store data in a column-based data structure. As such, all the data that belongs to a same column is saved together such that when performing a column-based operation, such as reordering columns, a reference to the column can be changed.

Although storing data in a column-based data structure (e.g., to perform column-based operations in association with an inconsistent chunk schema), the distributed data set can expose a row-based API to the external computing service. In this regard, upon a request for a row, the distributed data set component can access each column and identify or obtain data for the corresponding row. Such data can then be assembled into a row and provided as a row of data.

The columnar-based data structure can include performance characteristics associated with operations, such as column-based operations. A performance characteristic may refer to a time duration indicating a length of time it will take to perform a corresponding operation. Utilizing performance characteristics can support efficient data operations.

One example of a set of performance characteristics is provided in the below table. The first row provides a set of operations that can be performed, for example, via a column-based data structure. The second row provides performance characteristic indicating how long it will take to perform the corresponding operation. This can enable efficient conversion of chunk data into a desired data format. The value "n" generally refers to a number of data (e.g., number of rows). 0(n) then refers to the amount of time to perform operation, which will depend on the size of the list (e.g., the bigger the set of data, the more time required). O(1) refers to a constant time, such that the size of the data does not matter in relation to the amount of time generally expected to perform the corresponding operation.

| append row | head | tail | prepend row | append column | insert | update | remove | lookup | lookup by index | reorder columns |
|---|---|---|---|---|---|---|---|---|---|---|
| O(1) | O(1) | O(1) | O(1) | O(1) | O(n) | O(1) | O(n) | O(n) | O(1) | O(1) |

Upon the data existing in an appropriate distributed data set (e.g., RDD) format, the data frame component 1834 can convert the distributed data set format to a data frame that is used by the external computing service 1830 to process data. In some implementations, a distributed data set (e.g., RDD) utilizes a row-based API. In such implementations, to convert a distributed data set to a data frame, the distributed data set is converted on a row-by-row basis.

The data preparation component 1836 can use the generated data frame in association with the execution plan (e.g., metadata set) to prepare data for subsequent processing, such as machine learning operations. The data preparation component 1836 may perform any number of operations to prepare the data for subsequent processing. By way of example only, the metadata set may provide an indication to perform various preprocessing operations such as, for instance, converting data (e.g., converting data from one type of data to another), removing null values, or handling categorical fields, etc. In this way, the data of the data frame can be preprocessed based on the execution plan as preparation steps or operations for subsequent processing (e.g., machine learning data processing).

Upon performing data preparation operations, the enhanced data frame can be used by the processing component 1838 to perform processing operations as designated in the execution plan. For instance, the enhanced data frame can be used by the processing component 1838 to perform machine learning operations included in the execution plan, via a command pipeline. Such a command pipeline may be the external command pipeline, or portion thereof, provided to the external computing service 1830, or a pipeline generated or converted from, for instance, the external command pipeline provided to the external computing service 1830. In some embodiments, the command pipeline may only include commands for performing machine learning operations, such as fit and apply (e.g., fit PCA or fit linear regression).

In accordance with processing data at the processing component 1838, processed data can be generated. Such processed data may include a new data frame with data, a machine learned model, or the like. In this regard, upon performing the operations in association with the command pipeline, a new data frame or machine learned model may result or be output. For example, a new data frame can have a new field added to the enhanced data frame (e.g., via an "apply" machine learning command). Such data in the new field may be generated based on machine learning commands executed via the external computing service 1830. As another example, when executing a "fit" machine learning command, a machine learned model may be generated. As yet another example, when executing a "fit" machine learning command, both a machine learned model and a new data frame may be generated. In this case, after the machine learned model is generated, the model can be applied to the input data frame and generate a new data frame including a column of values predicted from application of the generated model. Although not depicted, in some cases, a machine learning library can be used by the processing component 1838 to generate a model. The output of the processing component 1838, such as a new data frame and/or model, can be provided to the data-processing system 1802. By way of example only, data can be provided to the search head, for example, via an output buffer of the data distribution tool 1822. The output buffer can have built-in flow control so that the data can be collected in parallel and not exceeding a preset maximum buffer size for managing memory consumption.

Such data in the output buffer can then be indexed or otherwise stored for subsequence access and utilization. The output can be provided to the search head in chunks of data, for example, to an output buffer at the search head. Advantageously, communicating any machine learned models generated via the external computing service 1830 to the data-processing system 1802 provides access to such externally generated machine learned models that can then operate on data within the data store 1814.

In embodiments, the search head 1816 can provide any such output data, such as a machined learned model, or data generated therefrom, to a client device, such as client device 1804, for display to a user. Additionally or alternatively, the search head 1816 can facilitate utilization of such output data for use in performing subsequent commands or processing. For instance, assume a query originally provided to the search head included a set of one or more commands to be performed subsequent to training a machine learned model. Upon obtaining a generated machine learned model from the external computing service 1830, the search head 1816 can facilitate operation or performance of the subsequent commands in the query pipeline.

External data processing can be performed at an external computing service in any number of ways. Returning to FIG. 19, FIG. 19 illustrates one exemplary implementation for externally processing data via an external computing service 1950. Assume that an execution plan 1944 is received at the external computing service 1950. Upon receiving the execution plan, a distributed data set component 1952 can be initiated to obtain input data, such as input data 1948. Accordingly, an input data set 1948 can be obtained at the distributed data set component 1952 in any number of partitions 1954A-1954N. The distributed data sets can be provided to the data frame component 1956 to generate a data frame, which can then be used by the data preparation component 1958 to prepare the data for processing. Upon the data being prepared, the enhanced data frame can be used by the processing component 1960 to process the data, for example, utilizing a machine learning pipeline of commands. The data 1962 (e.g., a new, modified, or updated data frame) output from the processing component 1960 can be provided to the data distribution tool on the search head for display, further analysis, or subsequent utilizations.

Embodiments have been generally described above in relation to a single external computing service performing computations, such as machine learning operations. However, embodiments are not intended to be limited thereto. In some embodiments, multiple external computing services may be candidate services for performing computations, for example, external to a data-processing system (e.g., data-processing system 1802 of FIG. 18). Such external computing services may comprise any number or type of analytics platforms.

Figure 21:
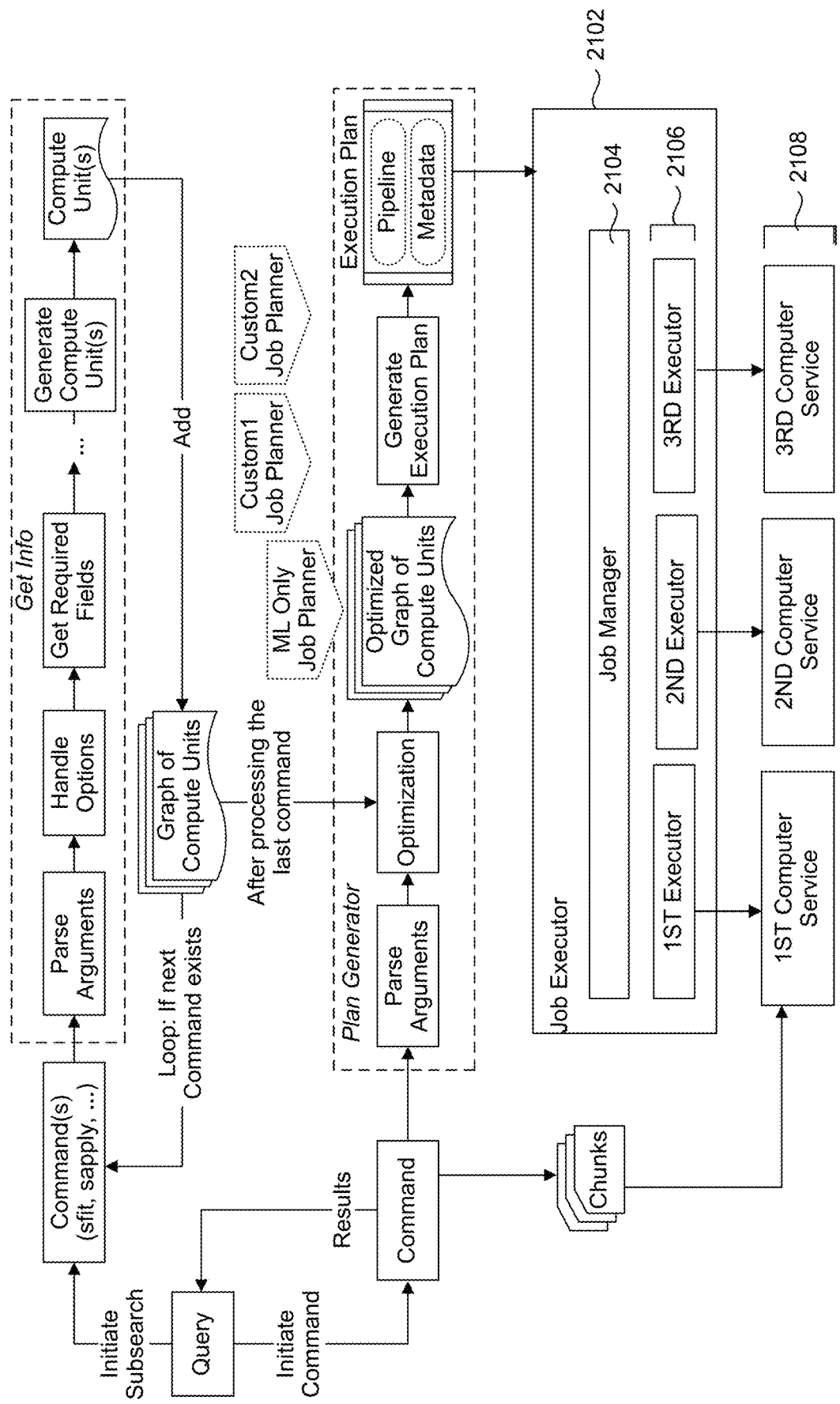
FIG. 21 illustrates an exemplary embodiment of a distributed data processing environment having multiple computing services, according to embodiments described herein.

With reference to FIG. 21, FIG. 21 provides an example implementation in which a job executor may facilitate management of various computing systems. In FIG. 21, job executor 2102 includes a job manager 2104, a set of executors 2106, and a set of computing services 2108. The job manager 2014 can generally analyze the data, such as an execution plan, and identify a best or more effective platform(s) for executing a given computation. For example, if one job is executed more efficiently in a first computing system, the job manager 2104 can communicate or provide the data, such as the execution plan, to the first executor for execution in association with the first computing system. As another example, the job manager 2014 may analyze an execution plan (e.g., compute graph) and determine to split into three compute jobs, for example, one to be performed via first computing machine, one to be performed via a second computing machine, and one to be performed via a third computing machine. As such, the job manager 2104 can optimize (e.g., based on calculations to perform, or efficiency thereof) and select a most efficient analytics platform for performing computations. Although such functionality is described in relation to job manager 2104, as can be appreciated, a plan generator, such as plan generator 1932 in FIG. 19, may additionally or alternatively perform such analysis.

The set of executors 2106 can facilitate performance of such operations with the corresponding computing services 2106. An example of an executor 2106 may be a job executor as implemented in association with FIG. 19. As can be appreciated, in one embodiment, a computing service 2108 may function in a manner similar to the external computing service 1950 described in FIG. 19. For instance, external computing service 1950 of FIG. 19 may be one example of a computing service 2108. Further, a computing service 2106 may include a component associated with a data-processing system 1802 of FIG. 18.

3.2 Illustrative Distributed Data Processing Operations

Figure 23:
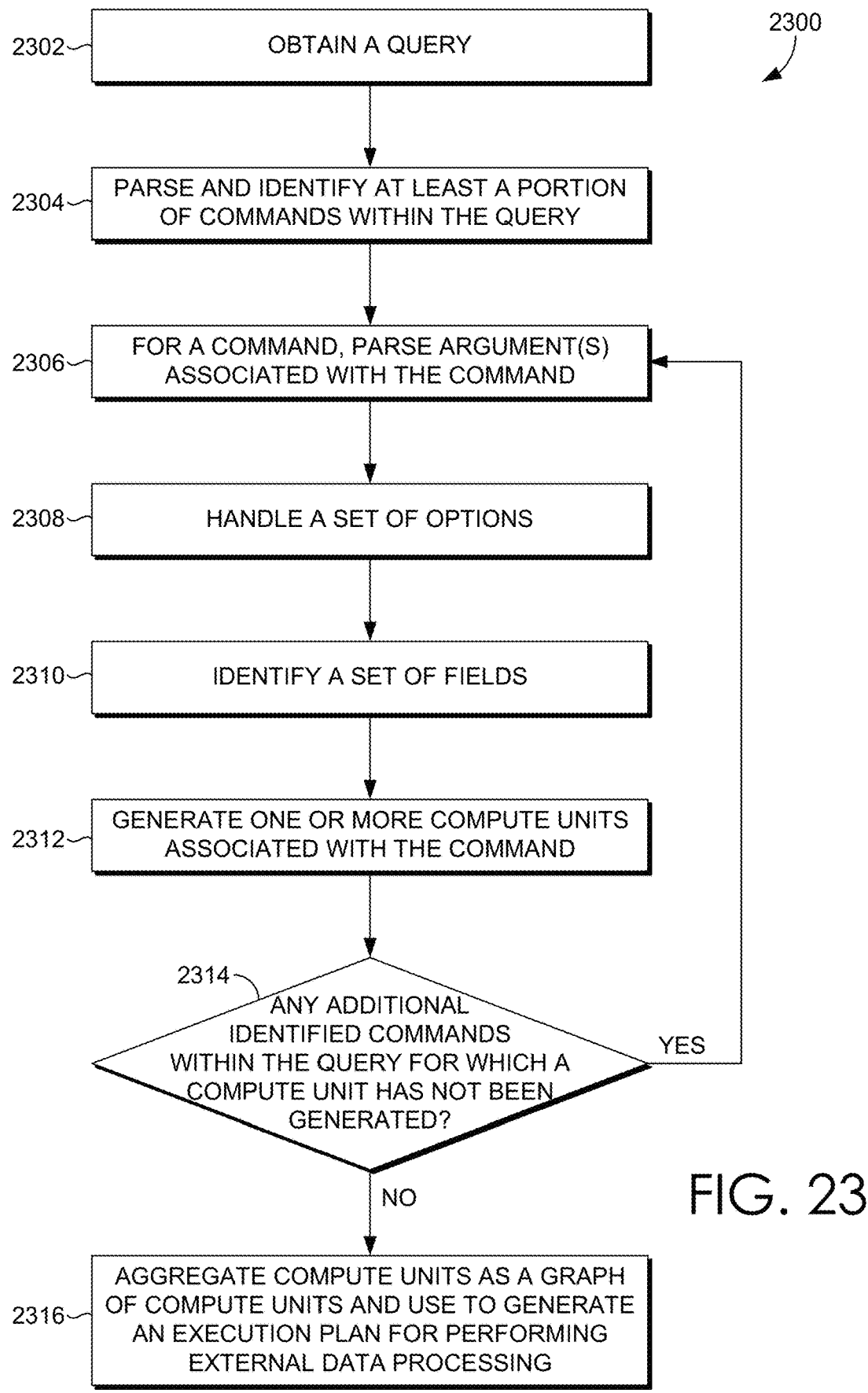
FIG. 23 is a flow diagram depicting an illustrative method of generating compute units, according to embodiments of the present invention.
Figure 24:
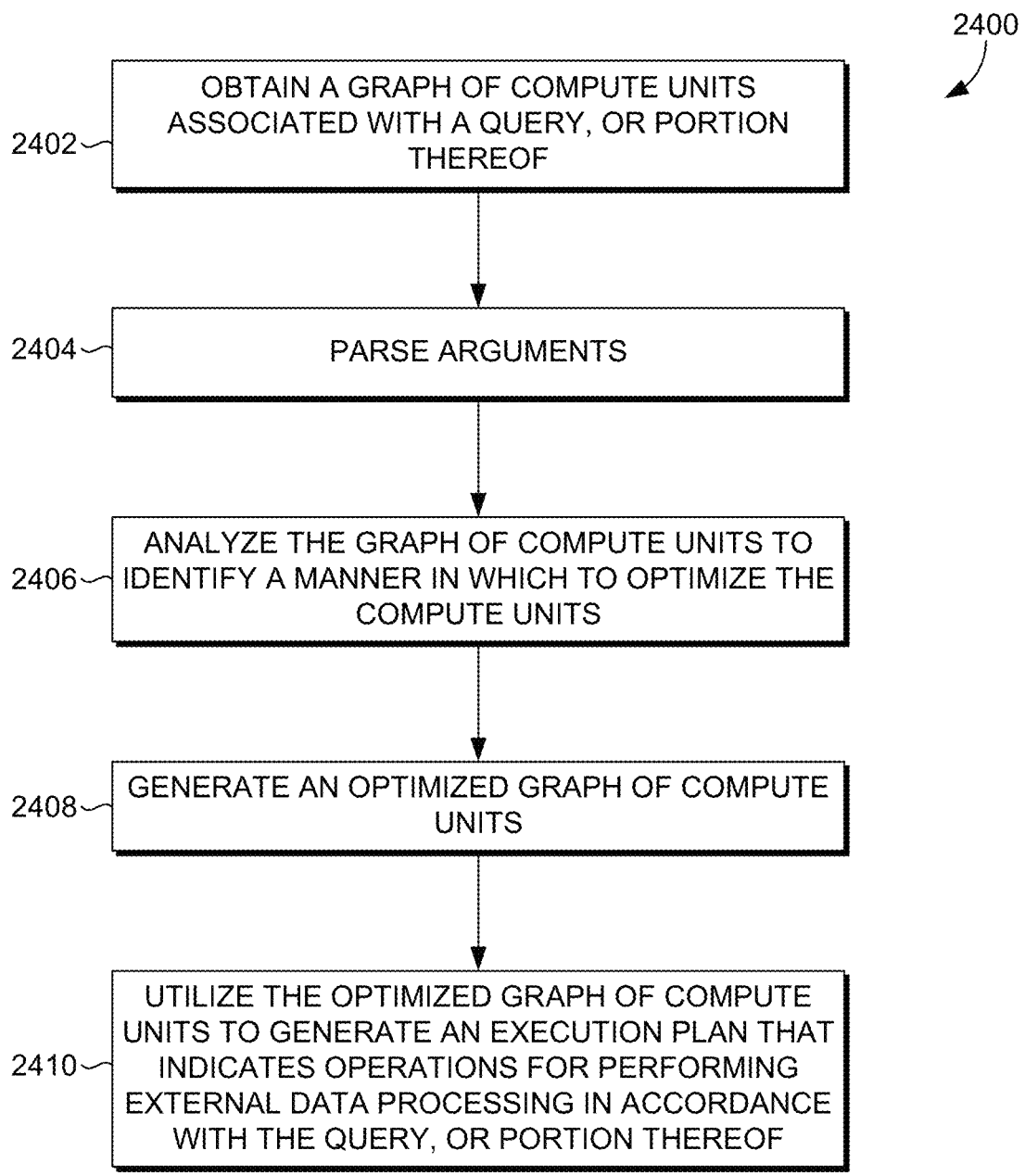
FIG. 24 is a flow diagram depicting an illustrative method of generating execution plans, according to embodiments of the present invention.
Figure 25:
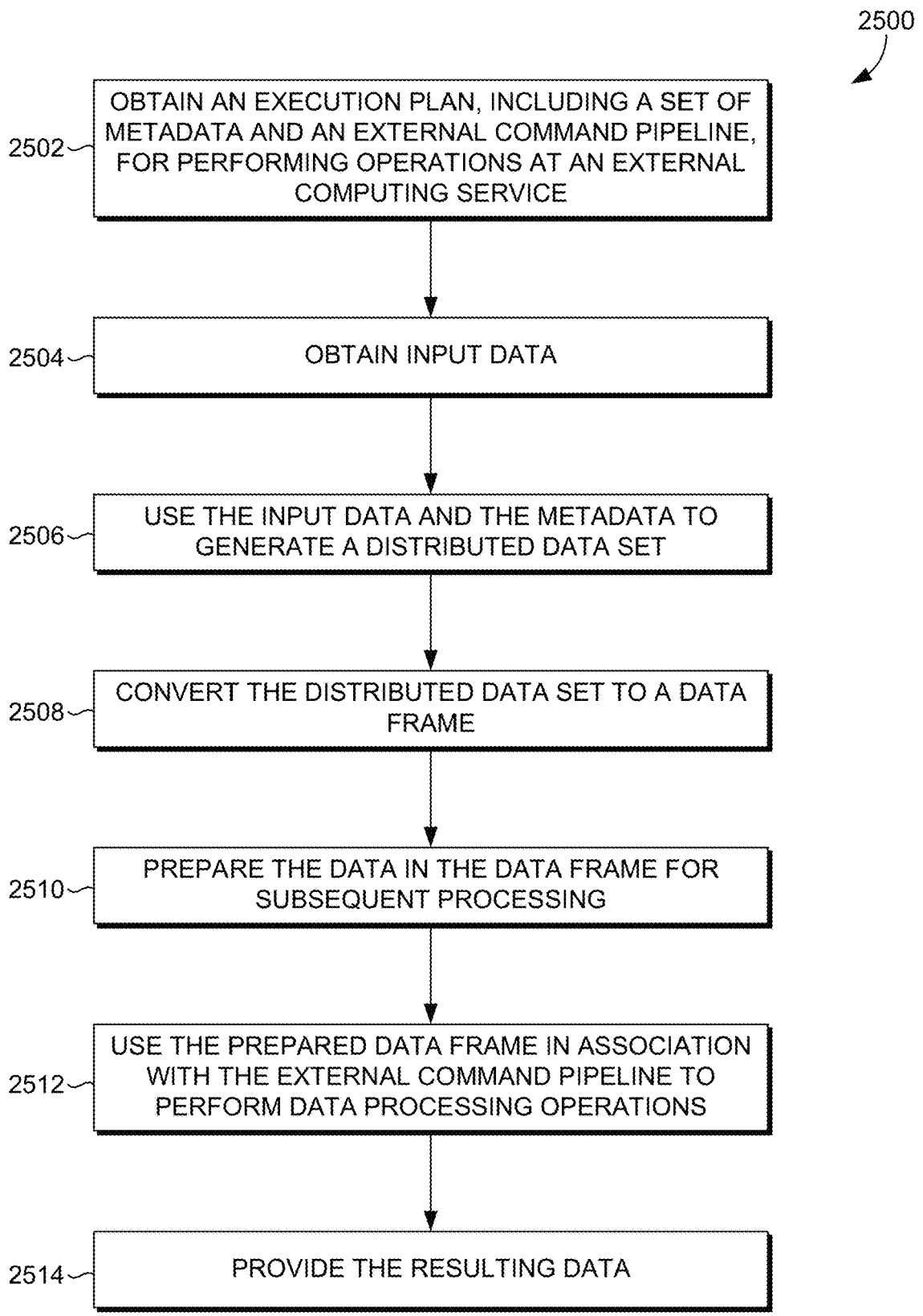
FIG. 25 is a flow diagram depicting an illustrative method of performing external data processing, in accordance with embodiments of the present invention.

FIGS. 22-25 illustrate various methods in accordance with embodiments of the present invention. Although the method 2200 of FIG. 22, the method 2300 of FIG. 23, the method 2400 of FIG. 24, and the method 2500 of FIG. 25 are provided as separate methods, the methods, or aspects thereof, can be combined into a single method or combination of methods. As can be appreciated, additional or alternative steps may also be included in different embodiments.

Figure 22:
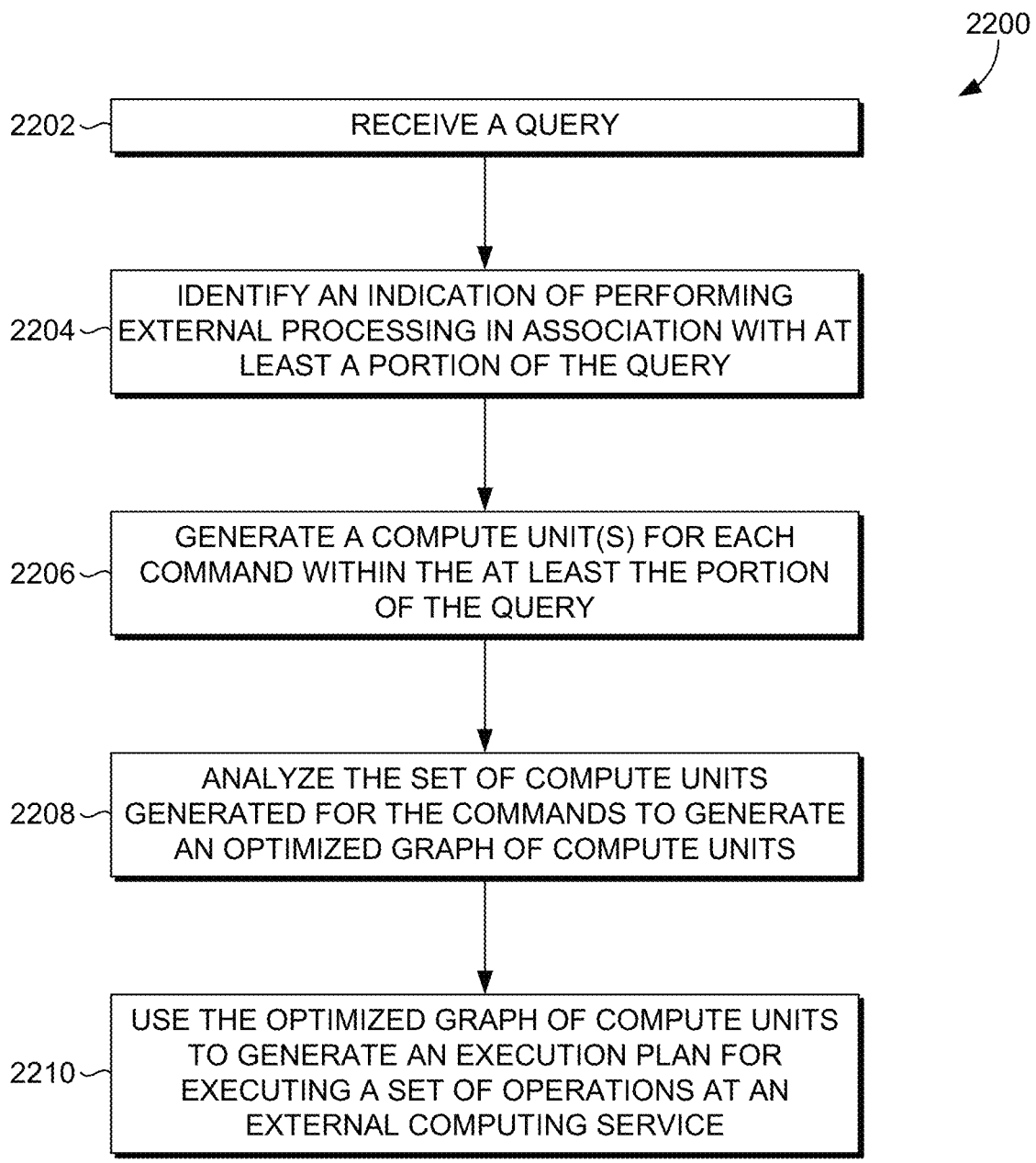
FIG. 22 is a flow diagram depicting an illustrative method of facilitating distributed data processing, according to embodiments of the present invention.

With initial reference to FIG. 22, FIG. 22 illustrates a method of facilitating distributed data processing. Such a method may be performed, for example, at a search head, such as search head 1816 of FIG. 18. Initially, at block 2202, a query is received. At block 2204, an indication of performing external processing in association with at least a portion of the query (subquery) is identified. For example, an external processing indicator, such as a predetermined command, may be identified within the query. Based on the indication to perform external processing, a compute unit(s) for each command within the subquery is generated, as shown at block 2206. The set of compute units generated for the commands within the subquery are analyzed at block 2208 to generate an optimized set of compute units. At block 2210, the optimized set of compute units are used to generate an execution plan for executing a set of operations at an external computing service. An execution plan can include a set of metadata and an external command pipeline (e.g., that indicates a command pipeline for performing machine learning operations). The execution plan is provided to the external computing service to initiate external data processing at the external computing service.

Turning to FIG. 23, FIG. 23 illustrates a method of generating a set of compute units. Such a method may be performed, for example, at a compute unit tool, such as compute unit tool 1818 of FIG. 18. Initially, at block 2302, a query is obtained. At block 2304, at least a portion of commands within the query are parsed and identified. For example, commands to be offloaded to an external computing service may be identified. For a first command, arguments associated with the command are parsed, as shown at block 2306. At block 2308, a set of options are handled. At block 2310, a set of fields, such as required fields (e.g., associated with target variables and feature variables), are identified. At block 2312, one or more compute units associated with the command are generated. Thereafter, at block 2314, a determination is made as to whether any additional identified commands within the query exist for which a compute unit(s) has not been generated. If additional commands exist, the method returns to block 2306-2314 until a determination is made at block 2314 that a compute unit(s) has been generated for each identified command. The compute units are aggregated as a graph of compute units and used to generate an execution plan for performing external data processing. This is shown at block 2316.

With reference to FIG. 24, FIG. 24 illustrates a method of generating an execution plan. Such a method may be performed, for example, at a data distribution tool, such as data distribution tool 1822 of FIG. 18. Initially, at block 2402, a set of compute units associated with a query, or portion thereof, is obtained. At block 2404, arguments are parsed. At block 2406, the set of compute units are analyzed to identify a manner in which to optimize the compute units. At block 2408, an optimized set of compute units is generated. Thereafter, the optimized set of compute units is utilized to generate an execution plan that indicates operations for performing external data processing in accordance with the query, or portion thereof. This is indicated at block 2410.

Turning to FIG. 25, FIG. 25 illustrates a method of performing external processing. Such a method may be performed, for example, at an external computing service, such as external computing service 1830 of FIG. 18. Initially, at block 2502, an execution plan, including a set of metadata and an external command pipeline, for performing operations at an external computing service is obtained. At block 2504, input data is obtained. At block 2506, the input data and the metadata are utilized to generate a distributed data set. In embodiments, the input data is stored in a columnar-based format. At block 2508, the distributed data set is converted to a data frame. In accordance with the metadata, the data in the data frame is prepared for subsequent processing, as indicated at block 2510. Subsequently, at block 2512, the enhanced data frame is used in association with the external command pipeline to perform data processing operations. The resulting data, such as a model or new data frame, is provided for display or subsequent utilization, as shown at block 2514.

3.3 Illustrative Hardware System

The systems and methods described above may be implemented in a number of ways. One such implementation includes computer devices having various electronic components. For example, components of the system in FIG. 18 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors in programmed computers. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 26:
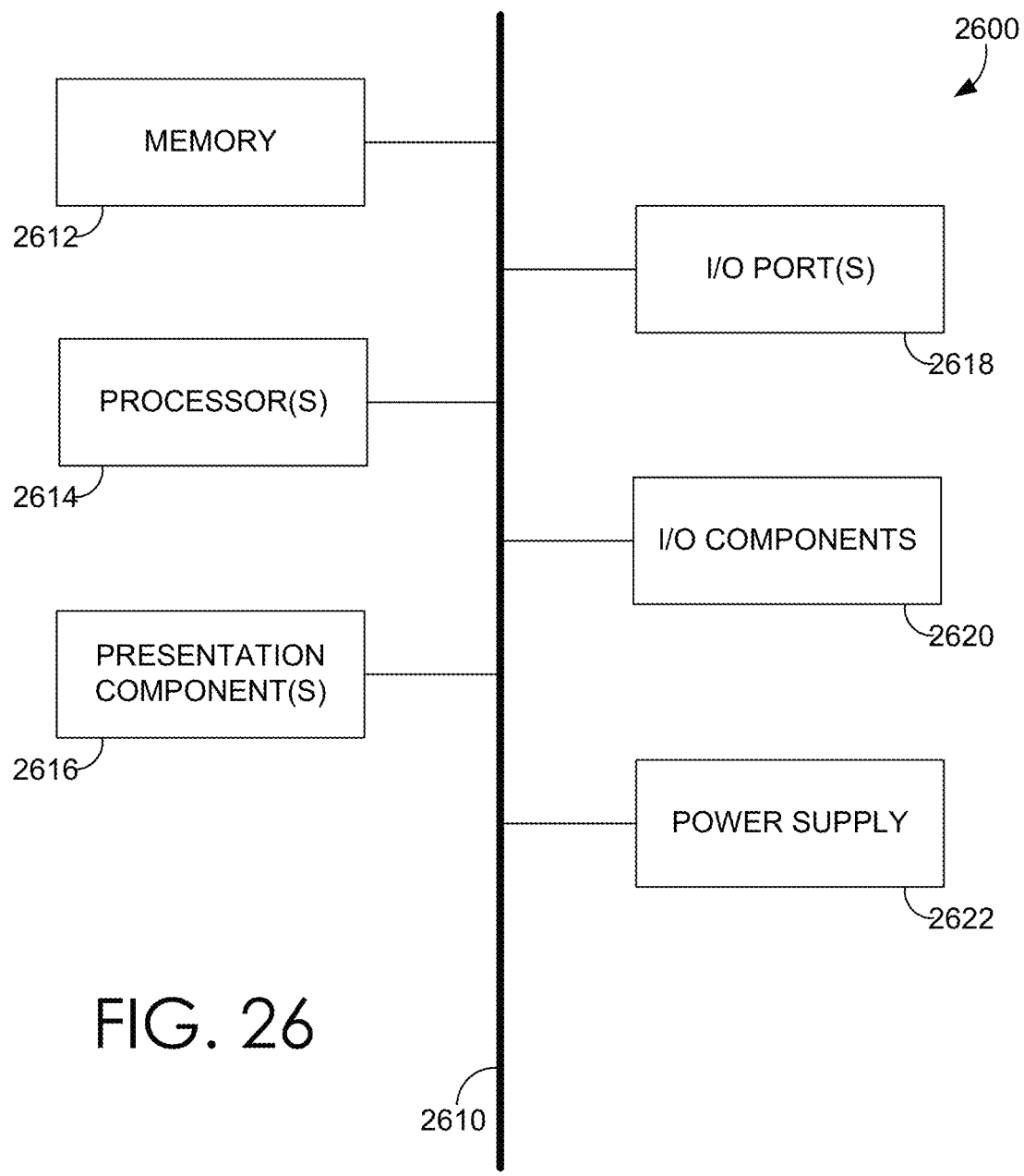
FIG. 26 is a block diagram of an example computing device in which embodiments of the present disclosure may be employed.

An example operating environment in which embodiments of the present invention may be implemented is described below in order to provide a general context for various aspects of the present invention. Referring to FIG. 26, an illustrative operating environment for implementing embodiments of the present invention is shown and designated generally as computing device 2600. Computing device 2600 is but one example of a suitable operating environment and is not intended to suggest any limitation as to the scope of use or functionality of the invention. Neither should the computing device 2600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialized computing devices, etc. The invention may also be practiced in distributed computing environments where tasks are performed by remote-processing devices that are linked through a communications network.

With reference to FIG. 26, computing device 2600 includes a bus 2610 that directly or indirectly couples the following devices: memory 2612, one or more processors 2614, one or more presentation components 2616, input/output (I/O) ports 2618, I/O components 2620, and an illustrative power supply 2622. Bus 2610 represents what may be one or more busses (such as, for example, an address bus, data bus, or combination thereof). Although depicted in FIG. 26, for the sake of clarity, as delineated boxes that depict groups of devices without overlap between these groups of devices, in reality, this delineation is not so clear cut and a device may well fall within multiple ones of these depicted boxes. For example, one may consider a display to be one of the one or more presentation components 2616 while also being one of the I/O components 2620. As another example, processors have memory integrated therewith in the form of cache; however, there is no overlap depicted between the one or more processors 2614 and the memory 2612. A person of skill in the art will readily recognize that such is the nature of the art, and it is reiterated that the diagram of FIG. 26 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 2600 of FIG. 26 and any other reference to "computing device," unless the context clearly indicates otherwise.

Computing device 2600 typically includes a variety of computer-readable media. Computer-readable media can be any available media that can be accessed by computing device 2600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2600. Computer storage media does not comprise signals per se, such as, for example, a carrier wave. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 2612 includes computer storage media in the form of volatile and/or nonvolatile memory. The memory may be removable, non-removable, or a combination thereof. Typical hardware devices may include, for example, solid-state memory, hard drives, optical-disc drives, etc. Computing device 2600 includes one or more processors 2614 that read data from various entities such as memory 2612 or I/O components 2620. Presentation component(s) 2616 present data indications to a user or other device. Illustrative presentation components include a display device, speaker, printing component, vibrating component, etc.

I/O ports 2618 allow computing device 2600 to be logically coupled to other devices including I/O components 2620, some of which may be built in. Illustrative components include a keyboard, mouse, microphone, joystick, game pad, satellite dish, scanner, printer, wireless device, etc. The I/O components 2620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 2600. The computing device 2600 may be equipped with depth cameras, such as stereoscopic camera systems, infrared camera systems, RGB camera systems, touchscreen technology, and combinations of these, for gesture detection and recognition. Additionally, the computing device 2600 may be equipped with accelerometers or gyroscopes that enable detection of motion.

As can be understood, implementations of the present disclosure provide for various approaches to data processing. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
    identifying, at a data-processing system, a set of commands in a query to process at an external computing service;
    for each command in the set of commands, identifying at least one compute unit including at least one operation to perform at the external computing service;
    analyzing each of the at least one compute unit associated with each command to identify a manner in which to execute the set of commands at the external computing service to reduce memory consumption or improve execution time, the manner being identified based on information accessible via the data-processing system and inaccessible to the external computing service, wherein the manner comprises at least one of a compute unit reordering, a merger of multiple compute units, an aggregation of multiple compute units, a removal of a compute unit, a parallel execution of multiple compute units, or a combination thereof; and
    providing, to the external computing service, an indication of the manner in which to execute the set of commands and a corresponding set of data to utilize for executing the set of commands at the external computing service.

2. The computer-implemented method of claim 1, wherein the external computing service is separate from a data-processing system that receives the query to search for events in a field-searchable data store, wherein each event includes a portion of raw machine data that reflects activity in an information technology environment and that is produced by a component of that information technology environment, and wherein each event is associated with a timestamp extracted from the raw machine data associated with that event.

3. The computer-implemented method of claim 1, wherein the corresponding set of data comprises a set of events, wherein each event includes a portion of raw machine data that reflects activity in an information technology environment and that is produced by a component of that information technology environment, and wherein each event is associated with a timestamp extracted from the raw machine data associated with that event.

4. The computer-implemented method of claim 1 further comprising receiving the query from a client computing device.

5. The computer-implemented method of claim 1, wherein the set of commands identified in the query correspond with an external processing indicator.

6. The computer-implemented method of claim 1, wherein the set of commands identified in the query correspond with an external processing indicator that provides an indication to process the set of commands in the external computing service.

7. The computer-implemented method of claim 1, wherein the set of commands identified in the query correspond with an external processing indicator that provides an indication to process the set of commands in the external computing service, the external processing indicator comprising a command, a symbol, a syntax, or combination thereof.

8. The computer-implemented method of claim 1, wherein the set of commands identified in the query consist of a portion of commands included in the query.

9. The computer-implemented method of claim 1, wherein for each command in the set of commands, the at least one compute unit further includes an indication of one or more fields to utilize in performing the at least one operation.

10. The computer-implemented method of claim 1, further comprising identifying one or more required fields for performing the at least one operation and using the one or more required fields to identify the at least one compute unit.

11. The computer-implemented method of claim 1 further comprising aggregating each of the at least one compute units associated with each command.

12. The computer-implemented method of claim 1, wherein the manner is identified in accordance with a preference to optimize memory consumption.

13. The computer-implemented method of claim 1, wherein the manner is identified in accordance with a preference to optimize execution time.

14. The computer-implemented method of claim 1, wherein the manner comprises an external command pipeline indicating machine learning commands to perform at the external computing service and a set of metadata indicating operations to perform to prepare data for performing the machine learning commands.

15. The computer-implemented method of claim 1, further comprising obtaining the set of data based on the query.

16. The computer-implemented method of claim 1, further comprising obtaining the set of data based on the query, wherein the set of data comprises chunks of events in an input buffer.

17. The computer-implemented method of claim 1, wherein the external computing service utilizes the indication of the manner and the corresponding set of data to execute the set of commands.

18. The computer-implemented method of claim 1, wherein the external computing services:
    obtains the set of data based on the query, the set of data comprising chunks of data;
    stores the chunks of data in a plurality of partitions in a columnar format;
    performs column-based operations on the chunks of data to obtain data having a same schema.

19. The computer-implemented method of claim 1, wherein the external computing service is selected from among a set of candidate external computing services.

20. The computer-implemented method of claim 1, wherein the external computing service is selected from among a set of candidate external computing services based on optimization of the external computing service to execute the set of commands compared to the other external computing services in the set of candidate external computing services.

21. One or more computer-readable storage media having instructions stored thereon, wherein the instructions, when executed by a computing device, cause the computing device to:
identifying, at a data-processing system, a set of commands in a query to process at an external computing service;
for each command in the set of commands, identifying at least one compute unit including at least one operation to perform at the external computing service;
analyzing each of the at least one compute unit associated with each command to identify a manner in which to execute the set of commands at the external computing service to reduce memory consumption or improve execution time, the manner being identified based on information accessible via the data-processing system and inaccessible to the external computing service, wherein the manner comprises at least one of a compute unit reordering, a merger of multiple compute units, an aggregation of multiple compute units, a removal of a compute unit, a parallel execution of multiple compute units, or a combination thereof; and
providing, to the external computing service, an indication of the manner in which to execute the set of commands and a corresponding set of data to utilize for executing the set of commands at the external computing service.

22. A computing device comprising:
one or more processors; and
a memory coupled with the one or more processors, the memory having instructions stored thereon, wherein the instructions, when executed by the one or more processors, cause the computing device to:
identifying, at a data-processing system, a set of commands in a query to process at an external computing service;
for each command in the set of commands, identifying at least one compute unit including at least one operation to perform at the external computing service;
analyzing each of the at least one compute unit associated with each command to identify a manner in which to execute the set of commands at the external computing service to reduce memory consumption or improve execution time, the manner being identified based on information accessible via the data-processing system and inaccessible to the external computing service, wherein the manner comprises at least one of a compute unit reordering, a merger of multiple compute units, an aggregation of multiple compute units, a removal of a compute unit, a parallel execution of multiple compute units, or a combination thereof; and
providing, to the external computing service, an indication of the manner in which to execute the set of commands and a corresponding set of data to utilize for executing the set of commands at the external computing service.

23. The computing device of claim 22, wherein the corresponding set of data comprises a set of events, wherein each event includes a portion of raw machine data that reflects activity in an information technology environment and that is produced by a component of that information technology environment, and wherein each event is associated with a timestamp extracted from the raw machine data associated with that event.

24. The computing device of claim 22 further comprising receiving the query from a client computing device.

25. The computing device of claim 22, wherein the set of commands identified in the query correspond with an external processing indicator.

26. The computing device of claim 22, wherein the set of commands identified in the query correspond with an external processing indicator that provides an indication to process the set of commands in the external computing service.

27. The computing device of claim 22, wherein the set of commands identified in the query correspond with an external processing indicator that provides an indication to process the set of commands in the external computing service, the external processing indicator comprising a command, a symbol, a syntax, or combination thereof.

28. The computing device of claim 22, wherein the set of commands identified in the query comprise a portion of commands included in the query.

29. The computing device of claim 22, wherein for each command in the set of commands, the at least one compute unit further includes an indication of one or more fields to utilize in performing the at least one operation.

* * * * *